US009294254B2

United States Patent
Ibrahim et al.

(10) Patent No.: US 9,294,254 B2
(45) Date of Patent: *Mar. 22, 2016

(54) SYSTEMS AND METHODS FOR INTERFERENCE MITIGATION IN HETEROGENEOUS NETWORKS

(71) Applicant: INTEL CORPORATION, Santa Clara, CA (US)

(72) Inventors: Ahmed S. Ibrahim, Cairo (EG); Hani H. Elgebaly, Cairo (EG); Esraa Makled, Cairo (EG); Ahmed M. Darwish, Cairo (EG)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,709

(22) Filed: Jun. 30, 2014

(65) Prior Publication Data

US 2014/0315567 A1    Oct. 23, 2014

Related U.S. Application Data

(62) Division of application No. 13/629,015, filed on Sep. 27, 2012, now Pat. No. 8,805,394.

(60) Provisional application No. 61/648,426, filed on May 17, 2012.

(51) Int. Cl.
*H04W 24/00* (2009.01)
*H04L 5/00* (2006.01)
(Continued)

(52) U.S. Cl.
CPC .............. *H04L 5/0073* (2013.01); *H04B 17/27* (2015.01); *H04W 52/241* (2013.01);
(Continued)

(58) Field of Classification Search
CPC ............................ H04W 76/048; H04W 88/06
USPC .............. 455/456.1, 445, 446, 438, 440, 522, 455/450, 405, 436, 452.1, 435.1, 562.1; 370/331, 335
See application file for complete search history.

(56) References Cited

U.S. PATENT DOCUMENTS

2006/0007043 A1 * 1/2006 Xin ........................... G01S 3/46
342/417
2009/0080402 A1    3/2009 Imamura
(Continued)

FOREIGN PATENT DOCUMENTS

EP           2 273 827 A1    1/2011
JP           2009049468 A    3/2009
(Continued)

OTHER PUBLICATIONS

Notice of Allowance received for U.S Appl. No. 13/629,015, mailed on May 19, 2014, 13 pages.
(Continued)

*Primary Examiner* — Kiet Doan
(74) *Attorney, Agent, or Firm* — Stoel Rives LLP

(57) ABSTRACT

Disclosed systems and methods mitigate interference in heterogeneous networks. Embodiments include adaptive or selective inter-cell interference coordination, adaptive multi-user zero forcing, adaptive power, and/or combinations of the foregoing. Techniques may be used to favor one group of users (e.g., femto users or macro users) over another. Certain embodiments focus quality of service (QoS) improvements on a first group of users, while using constraint processes to provide a threshold QoS for a second group of users.

13 Claims, 13 Drawing Sheets

(51) Int. Cl.
*H04W 72/08* (2009.01)
*H04W 72/00* (2009.01)
*H04W 52/24* (2009.01)
*H04B 17/27* (2015.01)
*H04W 84/04* (2009.01)
*H04W 52/26* (2009.01)
*H04W 52/14* (2009.01)

(52) U.S. Cl.
CPC ........... *H04W 52/244* (2013.01); *H04W 72/00* (2013.01); *H04W 72/082* (2013.01); *H04W 52/143* (2013.01); *H04W 52/265* (2013.01); *H04W 84/045* (2013.01); *Y02B 60/50* (2013.01)

(56) References Cited

U.S. PATENT DOCUMENTS

| | | | |
|---|---|---|---|
| 2010/0222062 A1 | 9/2010 | Chou et al. | |
| 2010/0273473 A1* | 10/2010 | Meshkati et al. | 455/423 |
| 2010/0329132 A1 | 12/2010 | Raghothaman et al. | |
| 2010/0329206 A1* | 12/2010 | Thome et al. | 370/331 |
| 2011/0009105 A1* | 1/2011 | Lee et al. | 455/418 |
| 2011/0211514 A1 | 9/2011 | Hamalainen et al. | |
| 2011/0212744 A1 | 9/2011 | Katayama et al. | |
| 2011/0287756 A1 | 11/2011 | Cho et al. | |
| 2012/0184311 A1 | 7/2012 | Yamamoto et al. | |
| 2012/0249359 A1 | 10/2012 | Kurono | |

FOREIGN PATENT DOCUMENTS

| | | |
|---|---|---|
| JP | 2011146805 A | 7/2011 |
| JP | 2012005079 A | 1/2012 |
| WO | 2010/078476 A1 | 7/2010 |
| WO | 2010/094482 A1 | 8/2010 |
| WO | 2010124243 A1 | 10/2010 |
| WO | 2011021387 A1 | 2/2011 |
| WO | 2011043413 A1 | 4/2011 |

OTHER PUBLICATIONS

Office Action received for U.S. Appl. No. 13/629,015, mailed on Jan. 6, 2014, 12 pages.
Ibrahim, et al., "Adaptive Interference Mitigation Techniques for Femtocells", IEEE Wireless Communications and Networking Conference (WCNC), Apr. 1-4, 2012, pp. 1218-1223.
Makled, et al., "Non-Unanimous Power Inter-cell Interference Coordination in Heterogeneous Networks", 75th IEEE Vehicular Technology Conference (VTC Spring), May 6-9, 2012, pp. 1-6.
International Searching Authority, International search Report and written Opinion received for PCT Patent Application No. PCT/US2013/040981, mailed on Aug. 26, 2013, 12 pages.

* cited by examiner

SYSTEMS AND METHODS FOR INTERFERENCE MITIGATION IN HETEROGENEOUS NETWORKS

RELATED APPLICATION

This application is a divisional of U.S. application Ser. No. 13/629,015, filed Sep. 27, 2012, which claims the benefit under 35 U.S.C. §119(e) of U.S. Provisional Application No. 61/648,426, filed May 17, 2012, each of which is hereby incorporated by reference herein in its entirety.

TECHNICAL FIELD

This disclosure relates to communication networks. Specifically, this disclosure relates to systems and methods for mitigating interference in heterogeneous networks.

BACKGROUND

A need for higher data rates in wireless communication systems has arisen from a rapid advancement of wireless handheld device technologies. To cover the need for increased capacity, heterogeneous networks were introduced. Heterogeneous networks include a hierarchical deployment of low power, small footprint stations to increase system capacity and coverage within a larger coverage area. For example, femto cells, pico cells, relays, and/or distributed antennas may be used within a macro cell coverage area. However, the femto cells, pico cells, relays, and/or distributed antennas interfere with the time and frequency resources of the macro cell to cause degradation in cell edge throughput.

DETAILED DESCRIPTION

Figure 1A:
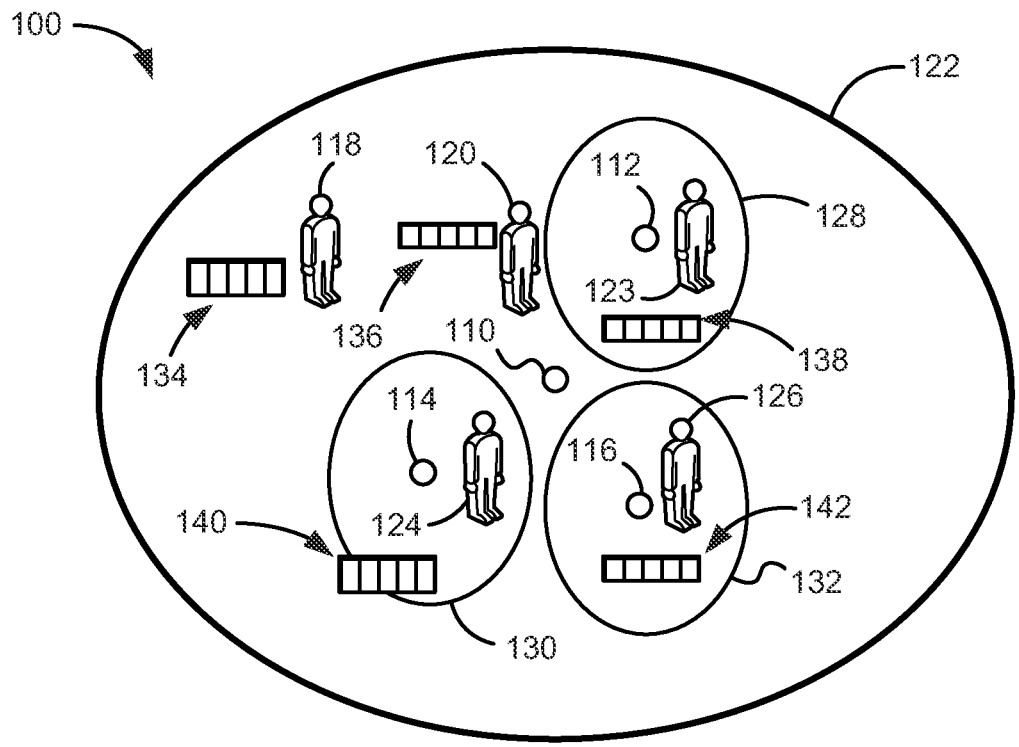
FIGS. 1A and 1B are block diagrams illustrating a heterogeneous network.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

I. Introduction

Heterogeneous networks provide a cost-effective way to increase system capacity and coverage in third generation partnership project (3GPP) long term evolution (LTE) networks, worldwide interoperability for microwave access (WiMAX) IEEE 802.16p networks, and networks according to other standards. By way of example, embodiments discussed herein are directed to reducing interference in a femto cell deployed within building (e.g., house, apartment, office building, or other structure) in a macro cell coverage area. Persons skilled in the art will recognize from the disclosure herein, however, that other types of heterogeneous networks may also be used including, for example, networks that include pico cells, micro cells, relays, distributed antennas, or other components that may interfere with one another or with a base station or macro cell. Further, skilled persons will recognize that the disclosure is not limited to indoor deployment of femto stations or other stations, and that an intended coverage area of a femto station may include outdoor locations, indoor locations, or a combination of outdoor and indoor locations.

In an example embodiment described herein, one or more femto stations provide coverage and capacity enhancement for indoor subscribers who are a part of a closed subscription group (CSG). Thus, CSG subscribers' user equipment (UE) may be associated with and communicate through one or more of the femto stations. On the contrary, indoor UEs or other UEs that are within a coverage area of the femto stations, but which are not part of the CSG, are not allowed to associate with or communicate through the femto stations. Rather, the non-CSG UEs are generally associated with and communicate through the closest macro station.

For purposes of discussion herein, a UE that is associated with and communicates through a femto station is referred to as a "femto UE," while a non-CSG UE that communicates through a macro station is referred to as a "macro UE." Also, a macro UE that is currently in a building covered by a femto station, or that is otherwise within the coverage area of the femto station (whether indoors or outdoors), is referred to herein as a "macro indoor UE." Further, a macro UE that is currently outside of a building covered by a femto station, or that is otherwise outside the coverage area of the femto station (whether indoors or outdoors), is referred to herein as a "macro outdoor UE." The UEs (e.g., femto UEs, macro indoor UEs, and macro outdoor UEs) may include, but are not limited to, mobile phones such as smart phones, personal digital assistants (PDAs), tablet computers, laptop computers, desktop computers, or the like. According to one embodiment, a UE may include a mobile information processing device running a mobile operating system such as MeeGo®, Android®, iOS®, Windows Phone®, or the like.

Despite the significant indoor gains expected from deploying femto stations, there are numerous challenging technical problems, such as the interference between femto stations and macro stations. Interference mitigation techniques related to femto stations in heterogeneous networks include inter-cell interference coordination (ICIC) based on resource management and allocation, multi-user zero forcing (MUZF) beamforming based on using antenna diversity to direct transmission, and power control techniques based on adjusting the transmitted power on each resource to guarantee a certain quality of service (QoS) for the UEs.

Figure 1B:
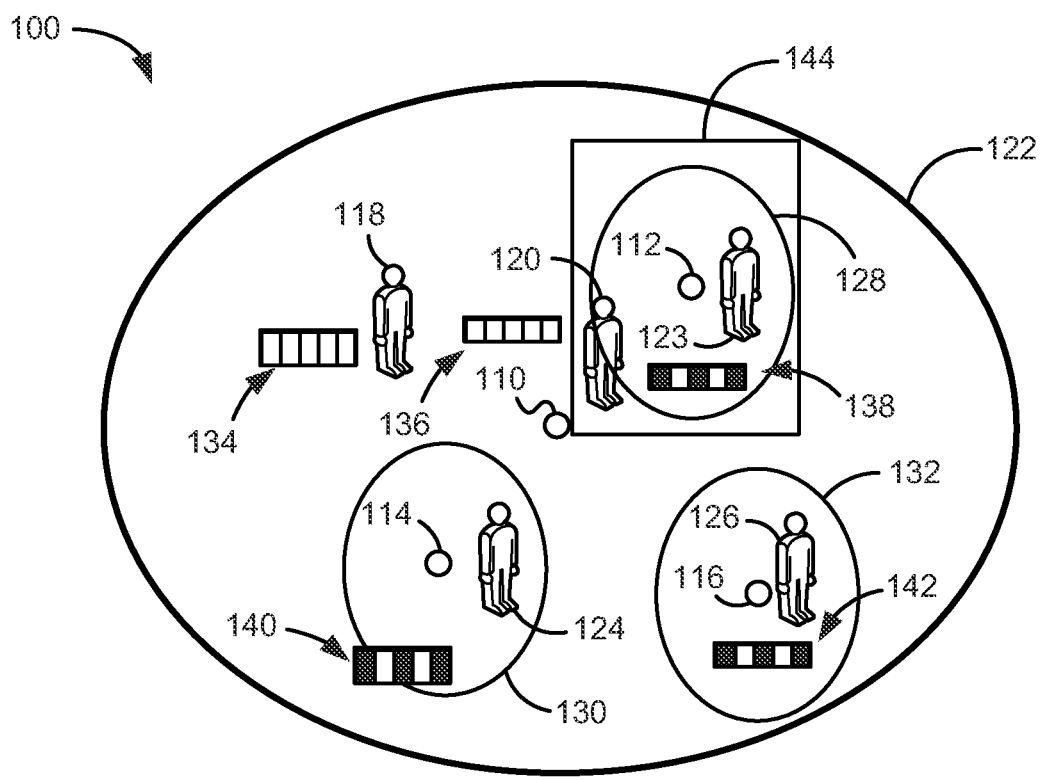

Generally, ICIC depends on shutting off the femto resources over some part of their transmission so that a corresponding area of the frame is interference free. For example, FIGS. 1A and 1B are block diagrams illustrating a heterogeneous network 100 including a macro evolved node B (eNB) 110 and a plurality of lower power communication nodes, which in this example are femto stations 112, 114, 116. The macro eNB and the femto stations 112, 114, 116 each include a transceiver including one or more antennas and processors for transmitting radio frequency (RF) signals. In this example, there are two macro users 118, 120 (i.e., users with macro UEs) within the transmission coverage area 122 of the macro eNB 110. By way of example, FIGS. 1A and 1B also show one femto user 123, 124, 126 within each transmission coverage area 128, 130, 132 of the respective femto stations 112, 114, 116.

As shown in FIG. 1A, the macro eNB 110 assigns a set of macro resource blocks 134 to the macro user 118 and a set of macro resource blocks 136 to the macro user 120. Similarly, the femto station 112 assigns a set of femto resource blocks 138 to the femto user 123, the femto station 114 assigns a set of femto resource blocks 140 to the femto user 124, and the femto station 116 assigns a set of femto resource blocks 142 to the femto user 126. The resource blocks 134, 136, 138, 140, 142 may include time resources, frequency resources, processing resources, and/or other resources used by the macro eNB 110 and the femto stations 112, 114, 116 to communicate with the UEs of the respective users 118, 120, 123, 124, 126.

In FIG. 1B, the macro user 120 enters a building 144 and the UE of the macro user 120 changes from a macro outdoor UE to a macro indoor UE. Interference between the macro eNB 110 and the femto station 112, however, may cause the macro user 120 to be dissatisfied with the speed and/or quality of communication within the building 144. To solve or reduce the problem, the ICIC technique shuts off a certain percentage of the femto resource blocks 138, 140, 142. In FIG. 1B, the darkened blocks represent turned off resources in the femto resource blocks 138, 140, 142. The ICIC technique increases cell edge performance in heterogeneous networks, but the performance is still low compared to homogeneous network cell edge performance. Further, by shutting off a percentage of the femto resources, the ICIC technique reduces the capacity of the femto stations 112, 114, 116.

Generally, the MUZF beamforming technique uses multiple antennas to direct the femto station transmission on an orthogonal channel to macro UE transmission. The femto station determines the macro transmission direction from an uplink transmission reaching the femto station. Each femto station estimates the channel(s) towards its neighboring macro indoor UE(s) from the uplink transmission of the macro UE. Then, each femto station obtains the orthogonal direction to the space spanned by the macro UE and multiplies its transmitted signal by the null space matrix so that its effect on macro indoor UEs is minimized. Macro users are satisfied because the interference is much less, but femto UEs suffer a decrease in power. Further, if a femto user happens to stand in a position where the macro UE is located, there may be a problem in coverage for the femto UE.

Power control techniques include an adaptive power (AP) scheme that targets the benefit of both macro UEs and femto UEs, while keeping the power at efficient usage levels. The AP scheme adjusts the power of femto stations independently to satisfy a QoS parameter for a certain group of users. The AP scheme may be referred to as non-unanimous because, under normal conditions, each femto station acts independently from other stations to satisfy the needs of its surrounding users.

Figure 2:
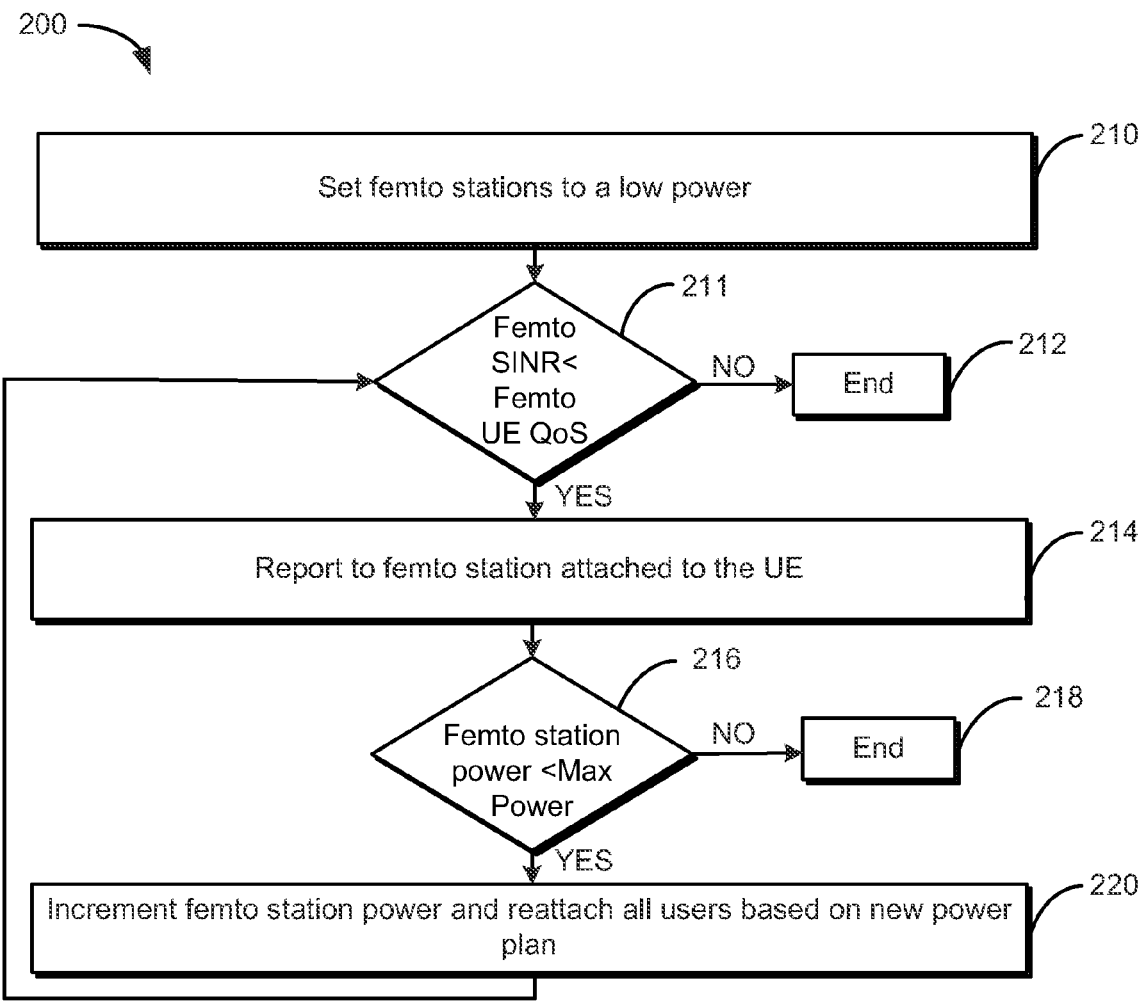
FIG. 2 is a flow chart of an example method according to a first type of adaptive power embodiment.

A first type of AP focuses on satisfying a femto QoS by decreasing the femto power to thereby increase the macro indoor UE's signal-to-interference-plus-noise-ratio (SINR) and to satisfy a certain femto SINR performance. An aim of the first type of AP is to avoid decreasing capacity at the same time as increasing cell edge performance. FIG. 2 is a flow chart of an example method 200 according to the first type of AP. The method 200 begins by setting 210 the femto stations to a low power. The femto stations associate with respective femto UEs, and the SINR of each femto UE is measured. For each femto UE, the method 200 then queries 211 whether the measured femto SINR is less than a targeted femto UE QoS. If not, the method ends 212. If, on the other hand, the measured femto SINR of the femto UE is lower than the targeted SINR, the method 200 reports 214 the particular UE to the femto station attached thereto and queries 216 whether the femto station power is less than a maximum power.

If the femto station power is greater than the maximum power, the process ends 218. If, however, the femto station power is less than the maximum power, the method 200 increments 220 the attached femto station's power and reattaches all users based on the new power plan. Then, to determine whether the femto SINR is fulfilled, the method 200 again queries 211 whether the femto SINR is less than the femto UE QoS, reports 214, and queries 216 whether the femto station power is less than the maximum power. When the SINR of all femto UEs is satisfied, the power is not increased. Also, if femto stations reach maximum power, no more increase can be done. Thus, instead of all femto stations transmitting at full power, the power of most femto cells is decreased dramatically.

Figure 3:
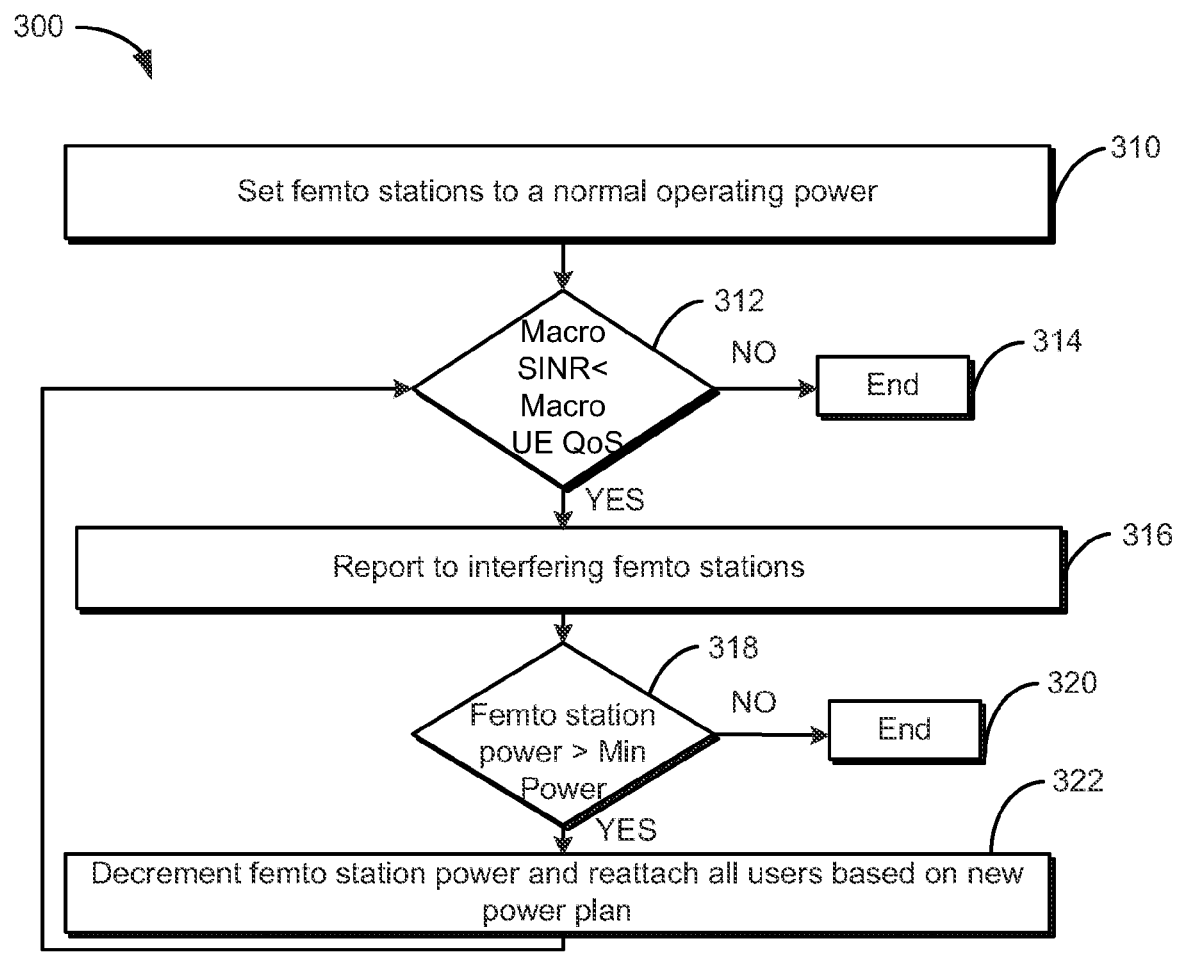
FIG. 3 is a flow chart of an example method according to a second type of adaptive power embodiment.

A second type of AP focuses on macro UEs by attempting to satisfy a certain macro UE QoS. In the second type of AP, the femto station starts at a high power. If the femto station causes interference such that a macro UE has lower QoS than it should, the femto station decrements its power to provide for lower interference and higher QoS at the macro UE. FIG. 3 is a flow chart of an example method 300 according to the second type of AP. The method 300 begins by setting 310 the femto stations to a normal operating power and measuring the SINR of each macro UE. For each macro UE, the method 300 then queries 312 whether the measured macro SINR is less than a targeted macro UE QoS. If not, the method ends 314. If, on the other hand, the measured macro SINR is lower than the targeted SINR, the method 300 reports 316 to the interfering femto stations and queries 318 whether the femto station power is greater than a minimum power. If the femto station power is less than the minimum power, the method 300 ends 320. If, however, the femto station power is greater than the minimum power, the method 300 decrements 322 the femto station's power and reattaches all users based on the new power plan. Then, to determine whether the macro SINR is fulfilled, the method 300 again queries 312 whether the macro SINR is less than the target macro UE QoS, reports 316, and queries 318 whether the femto station power is greater than the minimum power. The method 300 improves the performance of the macro UEs through satisfying a certain QoS and provides satisfaction for femto users as they all start at the highest power and only the ones affecting macro UEs are degraded.

Generally, however, sharing resources or reducing the femto station's power for all deployed femto stations results in lower femto throughput, which in turn limits the expected gains from the deployed femto stations. Thus, according to certain embodiments disclosed herein, adaptive techniques are used to selectively apply ICIC, MUZF, and/or power control techniques only to the femto stations that currently cause an unacceptable level of interference.

As discussed in detail below, deploying femto cells increases the SINR of femto UEs and may cause limited degradation to the performance of the outdoor macro UEs. However, the applicants have recognized that the macro indoor UEs are "victim" UEs of prior attempts at interference mitigation. In other words, prior attempts at interference mitigation have dramatically reduced the SINR performance of the macro indoor UEs. Thus, embodiments disclosed herein are directed to improving the performance of macro indoor UEs while preserving high throughput of the femto UEs. In certain embodiments, an adaptive ICIC (A-ICIC) technique is used wherein a femto station detects neighboring UEs and, if it detects a macro UE in its neighborhood (i.e., intended coverage area), periodically turns off a portion of its resources. Otherwise, the femto station utilizes all available resource blocks (RBs). In other embodiments, an adaptive multi-user zero-forcing (A-MUZF) technique is used wherein each femto cell is configured to selectively apply a nulling algorithm to null the femto interference to the nearby macro UEs. In other embodiments, adaptive power ICIC (AP-ICIC) or adaptive power MUZF (AP-MUZF) apply power control on top of A-ICIC or A-MUZF, respectively. As discussed below, each of these disclosed embodiments can significantly increase the throughput of the macro indoor UEs, while maintaining the high throughput achieved by deploying femto stations.

In one A-ICIC embodiment, a femto station detects the presence of a macro UE in the neighborhood (e.g., in the femto station's intended coverage area) through received power information or location information. The femto station may detect, for example, the highest received power from the macro UE to the femto station. The femto station may also detect the presence in the location by detecting the presence of the macro UE in the same building (e.g., apartment) as a femto UE. A femto station that recognizes the macro UE in the neighborhood shuts off transmission on a percentage of its resource blocks. The percentage of shut off resources may vary according to the needed capacity versus needed improvement of the cell edge users (e.g., as percentage of shut off increases, network capacity decreases and cell edge throughput increases). The resource blocks may include time resource blocks and/or frequency resource blocks.

In one embodiment, selective inter-cell interference coordination (S-ICIC) includes a femto station configured to shut off a percentage of its resource blocks. The percentage of shut off resources varies according to the needed capacity versus needed improvement of the cell edge users (e.g., as percentage of shut off increases, network capacity decreases and cell edge throughput increases). The resource blocks may include time resource blocks and/or frequency resource blocks. In certain embodiments, only cell edge users are scheduled (attached) to femto interference free resources.

In certain embodiments, AP is used with macro constraint (MC), which may be referred to herein as AP-MC. In such embodiments, femto stations operate at their minimum operation power and each femto station detects a QoS parameter of a femto user group. If the QoS parameter is not satisfied for a femto UE, the femto station detects the presence of macro UEs through a power-based approach. For example, the femto station may detect the presence of a macro UE by receiving power from the macro UE. If the QoS parameter of the macro UE is satisfied, the femto station increments the femto station's power to satisfy the QoS of the femto UEs, or else no action is taken. If the femto station reaches its normal operating power, no further action is taken.

In certain embodiments, AP is used with femto constraint (FC), which may be referred to herein as AP-FC. In such embodiments, femto stations operate at their normal operation power. Each femto station detects the presence of macro UEs through a power-based approach. For example, a femto station detects the presence of a macro UE if it receives power from the macro UE. The femto station then detects a macro UE QoS parameter. If the Macro UE QoS parameter is not satisfied, the QoS of the femto UEs attached to the femto station is detected. If the QoS parameter of Femto UEs is satisfied, the femto station decrements its power to satisfy the QoS of the macro UEs, or else no action is taken. If the femto station reaches its minimum power, no further action is taken.

In certain embodiments, adaptive power inter-cell interference coordination (AP-ICIC) is used wherein a femto station performs both a type of ICIC and a type of AP. In one embodiment, the type of ICIC includes the ICIC method described above wherein the femto station shuts off a percentage of its resource blocks. The percentage of shut off resources may vary according to the needed capacity versus needed improvement of the cell edge users (e.g., as the percentage of shut off increases, network capacity decreases and cell edge throughput increases). The resource blocks may be time resource blocks and/or frequency resource blocks. Any macro user may be assigned to a femto free resource. In another embodiment, the type of ICIC may be A-ICIC, as described above. In another embodiment, the type of ICIC may be S-ICIC, as described above. In one embodiment, the type of AP includes a femto focused AP wherein the femto station collects the value of a QoS parameter from the femto UEs. The QoS parameter threshold value is based on the performance of the UEs without interference mitigation. If the macro UE QoS is not satisfied, the femto station increases its power until the QoS parameter is satisfied or the femto station reaches its maximum or minimum power. In another embodiment, the type of AP includes a macro focused AP wherein the femto station determines a QoS parameter for macro UEs. The QoS parameter threshold is based on the performance of the UEs without interference mitigation. If the QoS is not satisfied, the femto station decreases its power until the QoS parameter is satisfied or the femto station reaches its maximum or minimum power.

In one embodiment, adaptive power adaptive multi-user zero forcing (AP-A-MUZF) is used wherein a femto station detects the macro UEs in the neighborhood by received power or location. The femto station detects the macro UE uplink. The femto station estimates channel(s) towards its neighboring macro indoor UE(s) and obtains the orthogonal to the space spanned by the macro UE(s). The femto station multiplies its transmitted signal by the null space matrix to minimize its effect on the macro indoor user. The femto station detects a QoS parameter for a group of users (e.g., femto UEs or macro UEs). If the QoS is not satisfied, the femto station adjusts its power until the QoS parameter is satisfied or the femto station reaches its maximum or minimum power.

In one embodiment, an adaptive power with constraint-ICIC (AP-C-A-ICIC) is used wherein a femto station detects the presence of a macro UE in the neighborhood through power received or location. The femto station that recognizes the macro UE in the neighborhood shuts off transmission on a percentage of its resource blocks (e.g., time and/or frequency resource blocks). Each femto station detects a QoS parameter of a certain user group. If the QoS parameter is not satisfied for a first group, the femto station detects the presence of UEs from a second group. If the QoS parameter of the second group is satisfied, the femto station adjusts its power to satisfy the QoS of the first group or reaches its maximum or minimum power, or else no further action is taken.

These and other embodiments are described below. Skilled persons will recognize from the disclosure herein that two or more of the described embodiments may be combined.

II. Example System Model

For purposes of discussion, an example model is provided of a simple heterogeneous cellular network. Skilled persons will recognize from the disclosure herein that other types of heterogeneous networks (including those with femto cells, pico cells, relays, distributed antennas, and combinations of the foregoing) may be used.

Figure 4:
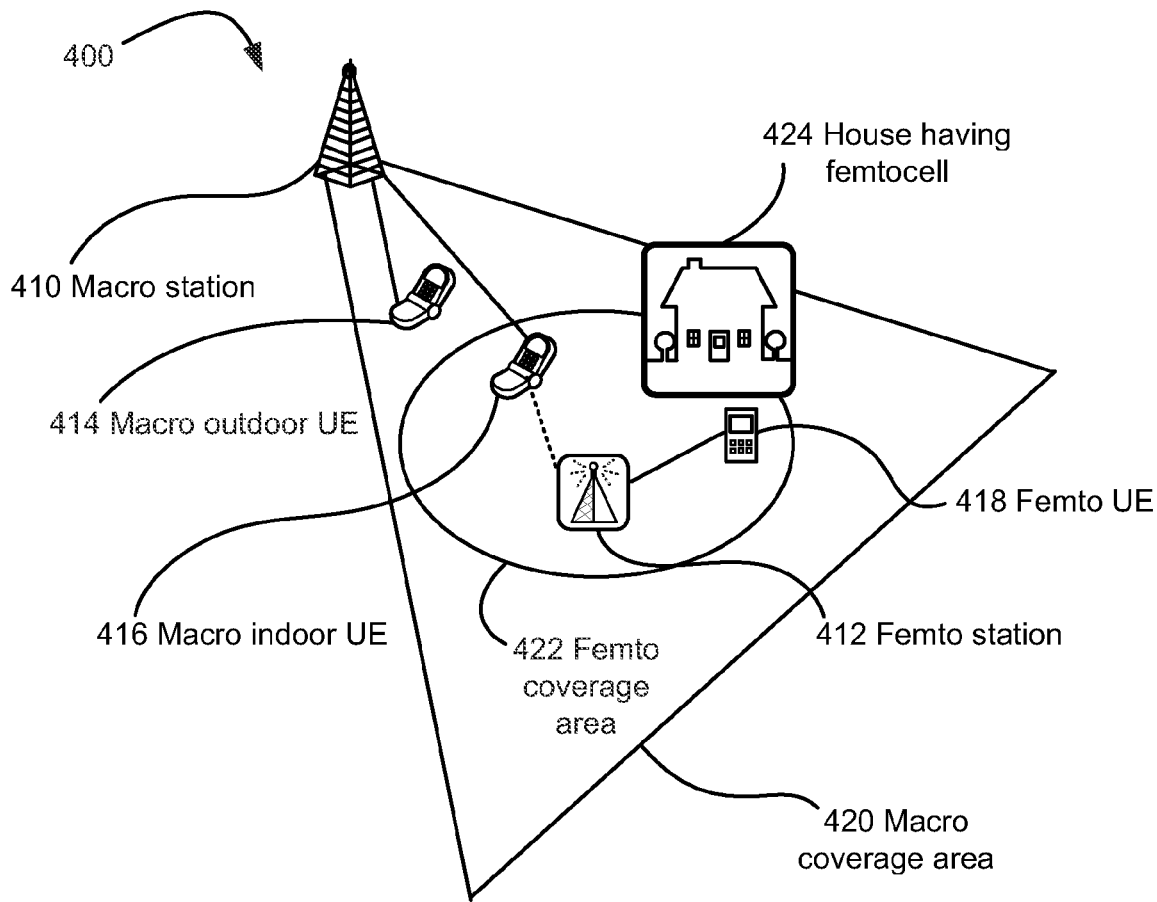
FIG. 4 is a simplified block diagram of a heterogeneous network configured to implement one or more of the embodiments described herein.

FIG. 4 is a simplified block diagram of a heterogeneous network 400 configured to implement one or more of the embodiments described herein. The network 400 includes a macro station 410, a femto station 412, a macro outdoor UE 414, a macro indoor UE 416, and a femto UE 418. The macro UEs 414, 416 and the femto UE 418 may be mobile devices that users transport into and out of a macro coverage area 420 of the macro station 410 and/or a femto coverage area 422 of the femto station 412. In the example shown in FIG. 4, the femto station 412 is located in or near a house 424. However, any type of building or other location (including outdoor locations) may be used. In addition, or in other embodiments, one or more of the macro UEs 414, 416 and femto UE 418 may be a fixed or non-mobile device. In the example shown in FIG. 4, the macro UEs 414, 416, femto station 412, and femto UE 418 are located within the macro coverage area 420. Further, the macro indoor UE 416 and the femto UE 418 are located within the femto coverage area 422. As discussed above, the femto UE 418 may be part of a CSG associated with the femto station 412. In this example, however, the macro indoor UE 416 is not subscribed to the CSG, and hence it (like the macro outdoor UE 414) is associated with the macro station 410. The dashed line between the femto station 412 and the macro indoor UE 416 represents an interference signal.

In the example model, the network 400 shown in FIG. 4 is expanded to include L macro stations (such as the macro station 410) and M femto stations (such as the femto station 412). The received signal at a macro user served by the $K^{th}$ macro station (referred to as macro-user K) can be given by $$y_k = \sqrt{\alpha_k} H_k W_k x_k + \sum_{\substack{i=1 \\ i \neq k}}^{L} \sqrt{\alpha_i} H_{i,k} W_i x_i + \sum_{j=1}^{M} \sqrt{\beta_j} H_{j,k} Q_j s_j + n_k, \quad (1)$$

where $H_k$; $H_{i,k}$; $H_{j,k}$ denote channels from the serving macro station, the $i^{th}$ macro station, and the $j^{th}$ femto station to a $k^{th}$ macro user, respectively, of size $N_r \times N_t$. Also, $\alpha$ and $\beta$ represent the path loss attenuation factor.

Further, $x_k$ denotes the transmitted signal to the $k^{th}$ macro-user of size $N_t \times 1$ and $s_j$ denotes the transmitted signal to the $j^{th}$ femto user of size $d \times 1$, where d depends on the transmission technique discussed below. $n_k$ denotes zero mean additive white Gaussian noise (AWGN) of the $k^{th}$ macro user and Q is a femto precoding matrix of size $N_t \times d$. W is a standard 3GPP macro precoding matrix of size $N_t \times N_t$.

$$\text{Let } \tilde{Q} = HQ \text{ and } \tilde{W} = HW. \quad (2)$$

It is assumed that there is one spatial stream only being transmitted from any of the macro or femto stations. It can be shown from equation (1) that the SINR of the $k^{th}$ macro-user can be represented as $$\gamma_k = \frac{\alpha_k \left\| \sum_{n=1}^{N_t} \tilde{W}_k(:,n) \right\|}{\sum_{\substack{i=1 \\ i \neq k}}^{L} \alpha_i \left\| \sum_{n=1}^{N_t} \tilde{W}_i(:,n) \right\| + \sum_{j=1}^{M} \beta_j \left\| \sum_{n=1}^{d} \tilde{Q}_j(:,n) \right\| + \sigma_k^2}, \quad (3)$$

where $\sigma_k^2$ denotes the variance of $n_k$. Similarly, the received signal of the $j^{th}$ femto user can be represented as $$y_j = \sqrt{\beta_j} H_j Q_j s_j + \sum_{k=1}^{L} \sqrt{\alpha_k} H_{k,j} W_k x_k + \sum_{k=1}^{M} \sqrt{\beta_i} H_{i,j} Q_i s_i + n_j, \quad (4)$$

and its SINR is given by $$\gamma_j = \frac{\beta_j \left\| \sum_{n=1}^{d} \tilde{Q}_j(:,n) \right\|}{\sum_{k=1}^{L} \alpha_k \left\| \sum_{n=1}^{N_t} \tilde{W}_k(:,n) \right\| + \sum_{\substack{i=1 \\ i \neq j}}^{M} \beta_i \left\| \sum_{n=1}^{d} \tilde{Q}_i(:,n) \right\| + \sigma_j^2}. \quad (5)$$

In order to model the complete heterogeneous network, a system level simulator (SLS) is used that follows the IEEE 802.16 evaluation methodology document for the downlink. In addition, the dual strip deployment model is used to model the femto cell deployment.

A. System Level Simulations

In the simulations described herein, which are provided by way of example only and are not necessary to practice the embodiments disclosed herein, the SLS simulates the deployment of 19 hexagonal cells. Each cell includes a macro base station at its center and three non-overlapping sectors. The network configuration parameters include: number of cells is 19; sectors per cell is 3; inter-cell distance is 1500; UEs per sector is 14; frames per trial is 100; number of trials is 100; carrier frequency is 2.5 GHz; frequency reuse factor is 1; and cell load is 100%.

Each UE experiences slow fading phenomenon, such as shadowing and path loss, as well as fast fading channel behavior. The SLS models the evolution of the desired signal and interference received by the UE in time, and employs a PHY abstraction model to predict the link layer performance. Then, a suitable modulation and coding scheme (MCS) is assigned based on the SINR value. Table 1 depicts system model parameters used in the simulation:

TABLE 1

System Model Parameters

| PARAMETER | VALUE |
| --- | --- |
| Channel Model | Extended ITU PedB (3 km/h) |
| Antenna configuration | 4 × 2 |
| Base station (BS) tx power | 47 dBm |
| Femto station (FS) tx power | 20 dBm |
| BS antenna pattern | 70 (−3 dB) with 20 dB front-to-back ratio |
| BS antenna gain | 17 dB |
| FS antenna gain | 5 dB |
| BS antenna spacing | 0.5 wavelength |
| SS antenna pattern | Omni-directional |
| SS antenna gain | 0 dB |
| SS antenna spacing | 0.5 wavelength |
| Cable loss | 2 dB |
| Detection | MMSE |
| Scheduling | Proportional fairness |
| Noise figure | 7 dB |
| MCS | QPSK (R = 1/12, 1/8, 1/4, 1/2, 3/4), 16-QAM (R = 1/2, 3/4), 64-QAM (R = 1/2, 2/3, 3/4, 5/6) |

Each user is allocated one or more resource blocks (RBs) based on proportional fairness (PF) scheduling criterion. Each frame has a total of 12 RBs, each including 4 frequency sub-channels and 24 orthogonal frequency division multiplexing (OFDM) symbols. Table 2 shows details of the OFDMA air interface values.

TABLE 2

OFDMA Parameters

| PARAMETER | VALUE |
| --- | --- |
| System bandwidth | 10 MHz |
| FFT size | 1024 |
| Subcarrier spacing | 10.9375 KHz |
| Data sub carriers | 768 |
| CP length | 1/8 |
| OFDMA symbol duration | 102.86 μsec |
| Permutation | LRU |
| Frame duration | 5 msec |
| Sub-channels/Frame | 48 |

The SLS provides a list of performance criteria that includes the cumulative distribution function (CDF) of the users' SINR distributions, users' average throughput, and aggregate sector throughput. The aggregate sector throughput is defined as the number of information bits per second that the sector can successfully deliver. The user and sector spectral efficiency (SE) (in bps/Hz) are calculated by dividing the respective throughput by the channel bandwidth, as $$SE = \frac{R}{W}, \quad (6)$$

where R is the aggregate throughputs, and W is the total bandwidth. In addition, the cell edge user SE is calculated, which corresponds to the 5% level of the CDF of the users' spectral efficiency.

B. Femto Dual Strip Deployment Model

Figure 5:
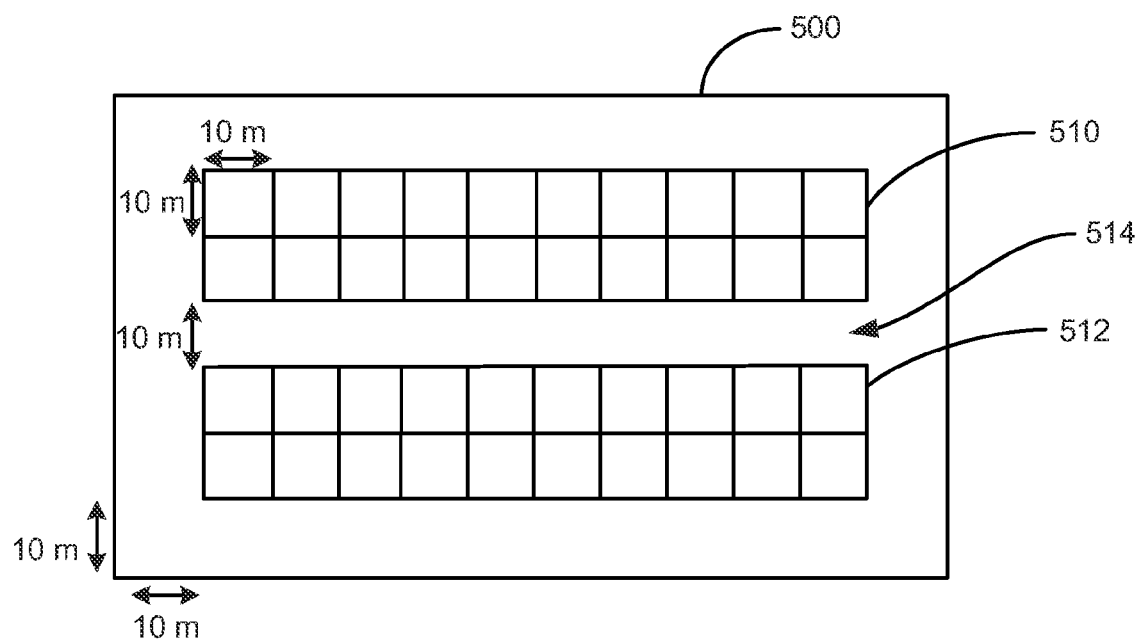
FIG. 5 schematically illustrates a femto dual strip deployment model used to model femto station deployment according to one embodiment.

FIG. 5 schematically illustrates a femto dual strip deployment model used to model femto station deployment according to one embodiment. Blocks 500 like the one shown in FIG. 5 are distributed randomly over a network. Each block 500 has two apartment strips 510, 512 with 2×N apartments in each strip. Each apartment has an area of 10×10 m². Between the two strips of apartments there is a 10 m wide street 514. Also, streets surround the two strips 510, 512, as shown in FIG. 5. Macro indoor users are distributed randomly across the femto block floors, and the rest of the macro users are outdoors. Femto stations are installed in the apartments according to the deployment ratio from the apartments. Some of the femto stations are activated and some are deactivated according to the activation ratio. In the example model, each femto station includes one femto UE located in the same apartment.

TABLE 3

Simulation Parameters of the Femto Block

| PARAMETER | VALUE |
| --- | --- |
| N (number of cells per row) | 10 |
| M (number of clusters per sector) | 1 |
| L (number of floors per cluster) | 1 |
| R (deployment ratio) | 20% |
| P (activation ratio) | 80% |
| Percentage of macro UEs being indoors | 60% |

C. Model Analysis

Figure 6:
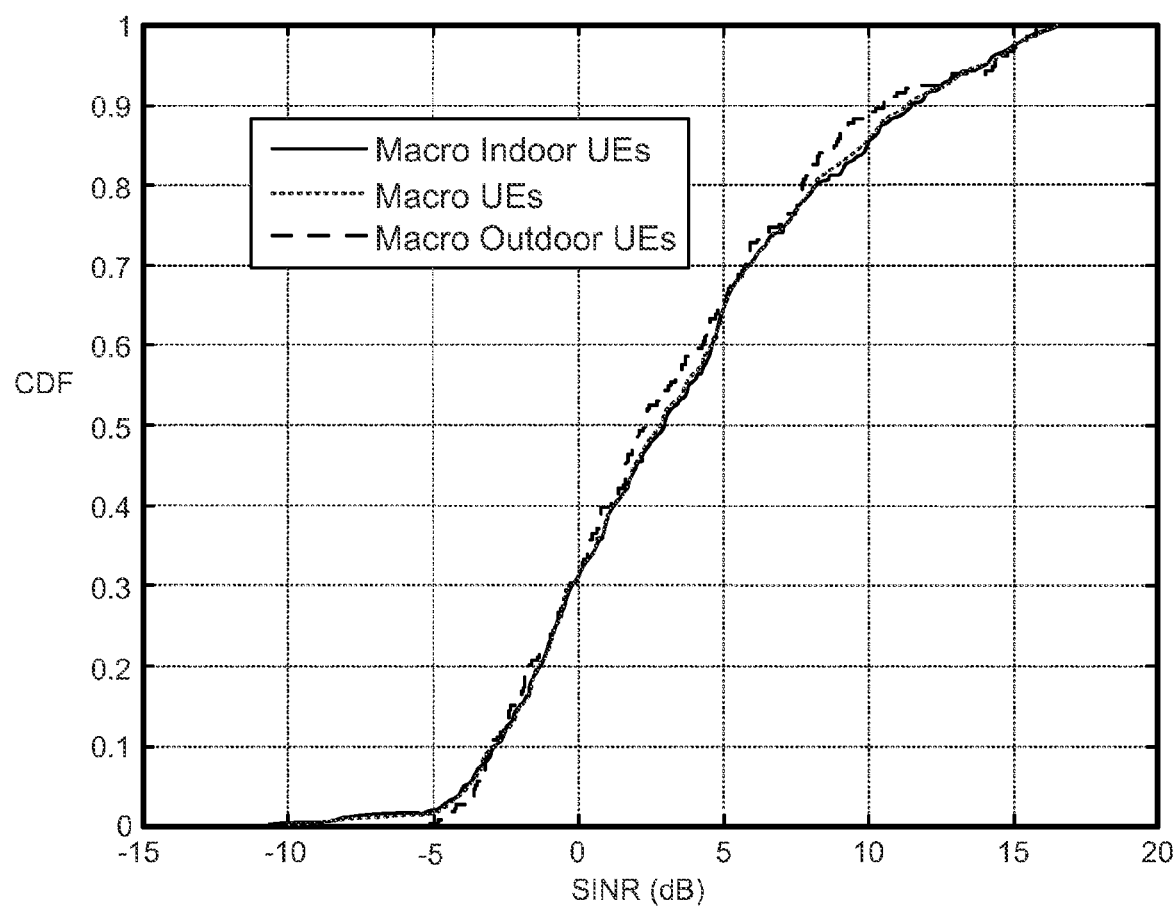
FIG. 6 is a graph illustrating SINR distributions for macro-only scenarios according to an example model.

Analysis of the model described above reveals problems with femto heterogeneous networks. First, as a reference case, consider the macro-only scenario which has macro stations only with no deployment of femto stations. To clearly understand the femto impact, the outdoor and indoor macro UEs are distinguished and it is noted that only the macro indoor UEs undergo the indoor penetration loss. FIG. 6 is a graph illustrating SINR distribution CDFs for the macro-only scenario according to the example model. As shown, the macro indoor UEs and the macro outdoor UEs have almost the same SINR distributions. In other words, the indoor penetration loss has little or no impact on the SINR value. This is true because both the desired signal and interference signals are reduced by the same value. Thus, the SINR ratio is substantially the same.

Figure 7:
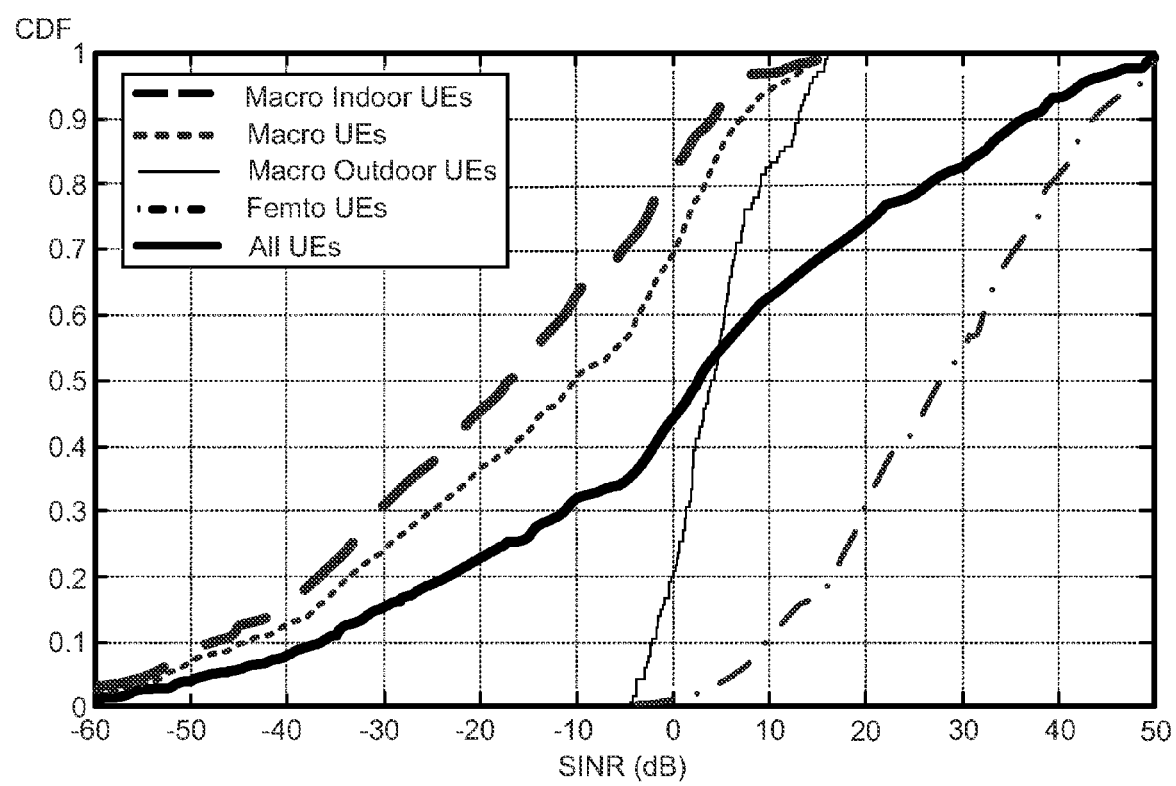
FIG. 7 is a graph illustrating SINR distributions for femto heterogeneous network scenarios according to the example model.

Second, consider the impact of deploying femto stations on the SINR of all the UEs. FIG. 7 is a graph illustrating SINR distribution CDFs for the femto heterogeneous network scenario according to the example model. As shown in FIG. 7, the femto UEs have large SINR, which is the desired impact of deploying femto stations. This is because femto UEs experience high desired signal power and low interference power. Comparing FIG. 7 to FIG. 6, it is shown that the macro outdoor UEs have no degradation due to the deployment of the femto stations. This is because the outdoor UEs receive low interference levels from the femto stations. However, the macro indoor UEs have dramatic degradation as the macro indoor UEs receive a large amount of interference from the femto stations. Thus, the applicants conclude that the macro indoor UEs are the victim UEs, which suffer the most from deploying the femto stations.

Embodiments disclosed herein of interference aware femto cells reduce or eliminate this impact on the macro indoor UEs, while preserving the high throughput of the femto UEs.

III. Resource Allocation Techniques for Inter-Cell Interference Coordination (ICIC)

Figure 8:
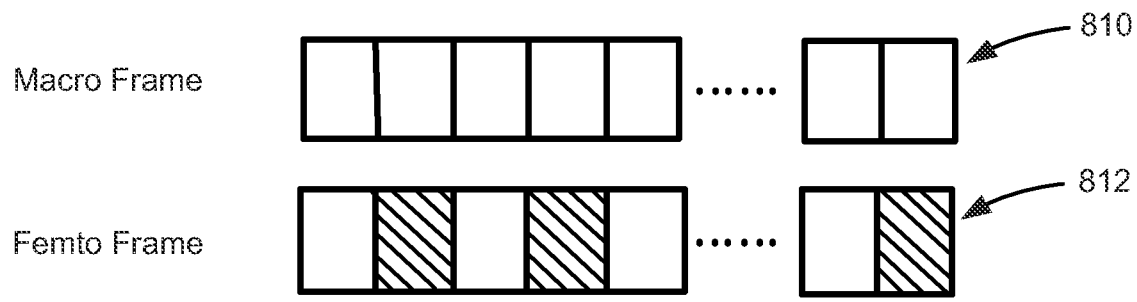
FIG. 8 is a block diagram illustrating an ICIC frame structure including resource blocks for a macro station and femto stations according to one embodiment.

In the typical ICIC algorithm, as discussed above, all of the femto stations do not transmit any data for a number of RBs. For example, FIG. 8 is a block diagram illustrating an ICIC frame structure including RBs 810 for a macro station and RBs 812 for all femto stations. In FIG. 8, all the femto stations are silent (represented by darkened blocks) for 50% of the RBs 812. On the contrary, the macro stations transmit their data across all the RBs 810. However, in a case where a particular femto station is not causing interference to any nearby macro indoor UE, there is no need to make that femto station silent over some of its RBs 812. Thus, a smart femto station is disclosed that detects the neighboring macro UEs and acts according to their status.

A. Selective ICIC (S-ICIC)

In S-ICIC, the femto stations schedule or reserve femto free resources to the cell edge users only (e.g., including macro indoor UEs). Although conventional ICIC gives a great advantage to macro users, its scheduling is not efficient. In contrast to S—ICIC, conventional ICIC assigns some of the femto free resources to the macro outdoor UEs, which are not suffering reduced performance due to interference from the femto stations. S-ICIC improves the cell edge users above that provided by ICIC, and at the same time does not degrade femto users below their ICIC operation. In normal ICIC operation, the capacity of the network decreases because some of the femto resources are not used.

B. Adaptive ICIC (A-ICIC)

A problem with S-ICIC and conventional ICIC is that they cause high degradation in the network capacity when compared with a femto baseline. The capacity degradation is caused by the large percentage of shut off femto station resources. In A-ICIC, each femto station detects whether it causes interference over a macro UE. If so, the femto station applies ICIC (e.g., by shutting off 50% of its RBs in a periodic manner, similar to the conventional ICIC). If, on the other hand, the femto station does not cause interference over a macro UE, the femto station does not restrict the use of its RBs (e.g., it may use all of its RBs, if needed).

The femto stations may detect the presence of a macro UE in the vicinity using, for example, a power-based approach or a location-based approach (e.g., an apartment-based approach). In the power-based approach, a macro indoor UE is detected when the power received by the macro indoor UE from the macro station is lower than the power received by the macro indoor UE from the femto station. In certain embodiments, the power-based approach does not put the limitation that both the macro indoor UE and the femto station need to be in the same femtocell location (e.g., apartment).

Figure 9:
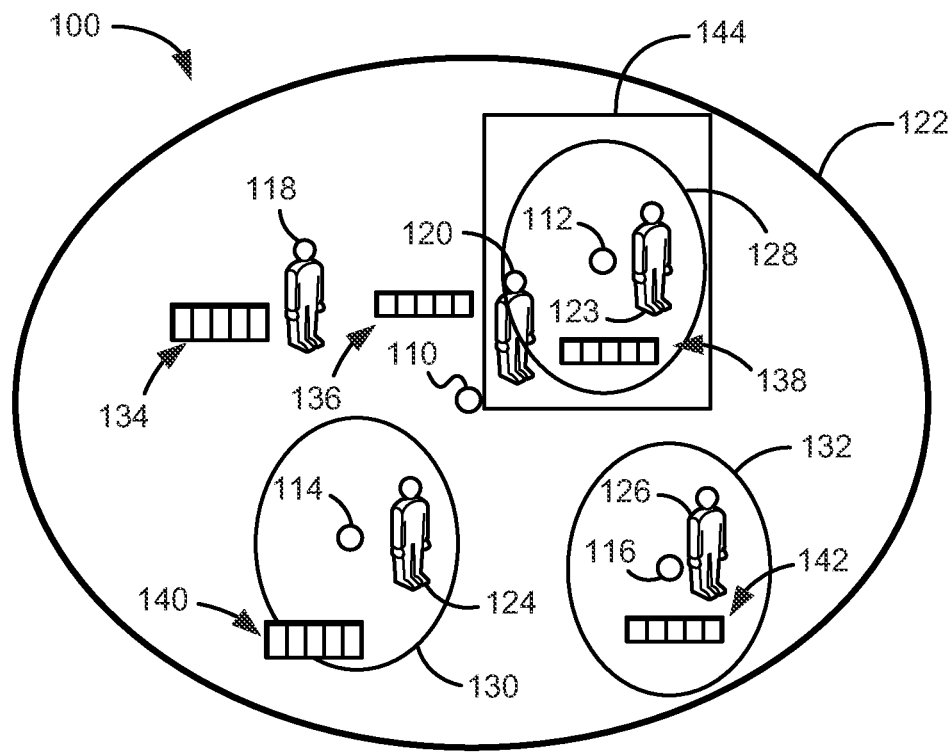
FIG. 9 is a block diagram illustrating the heterogeneous network shown in FIG. 1B configured to use adaptive inter-cell interference coordination with a location-based approach according to one embodiment.

In the location-based approach, the femto station applies the ICIC technique if it determines that it is in the same location (e.g., apartment, house, office, or other building) as a macro UE. For example, FIG. 9 is a block diagram illustrating the heterogeneous network 100 shown in FIG. 1B configured to use A-ICIC with a location-based approach according to one embodiment. As in FIG. 1B, the macro user 120 enters the building 144 and the UE of the macro user 120 changes from a macro outdoor UE to a macro indoor UE. However, unlike the conventional ICIC approach shown in FIG. 1B where each of the femto stations 112, 114, 116 shuts off a certain percentage of their respective femto resource blocks 138, 140, 142, the A-ICIC method provides that only the femto station 112 that detects the macro user 120 within the building 144 shuts off a percentage of its femto resource blocks 138. The other femto stations 114, 116 continue to use all of their respective resource blocks 140, 142. Thus, femto UEs benefit from A-ICIC as all femto stations (e.g., femto stations 114, 116) provide normal transmission except the ones (e.g., femto station 112) interfering with a macro UE. Consequently, more femto users are satisfied with the use of the femto UEs. Meanwhile, the macro indoor UEs are provided with a zone free from interference to transmit their data, which leads to a better satisfaction for the macro indoor users.

Figure 10A:
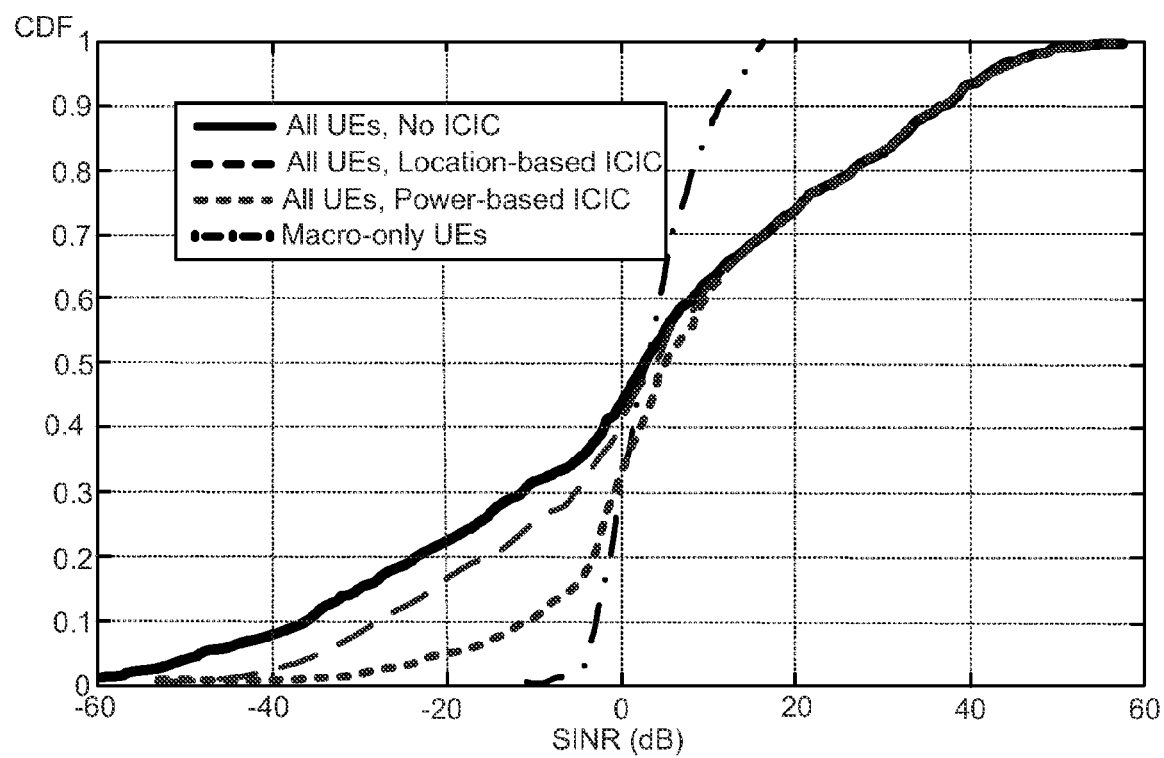
FIG. 10A is a graph of SINR distributions according to certain embodiments.

FIG. 10A is a graph of SINR CDF distributions of macro-only, baseline femto (no ICIC), and two A-ICIC techniques according to certain embodiments. As shown in FIG. 10A, the location-based (e.g., apartment-based) A-ICIC technique increases the SINR of the UEs with low SINR, which are the macro indoor UEs. On the other hand, A-ICIC has no impact on the UEs with high SINR, which are the macro outdoor UEs. Moreover, FIG. 10A shows that the power-based A-ICIC technique achieves higher SINR for the macro indoor UEs than the location-based technique, as it avoids interference to the macro indoor UEs from all the adjacent femto stations as well. Further, note that the SINR of the macro indoor UEs (below 0 dB) is upper-bounded by that achieved by the macro-only case (no femto stations are deployed).

Figure 10B:
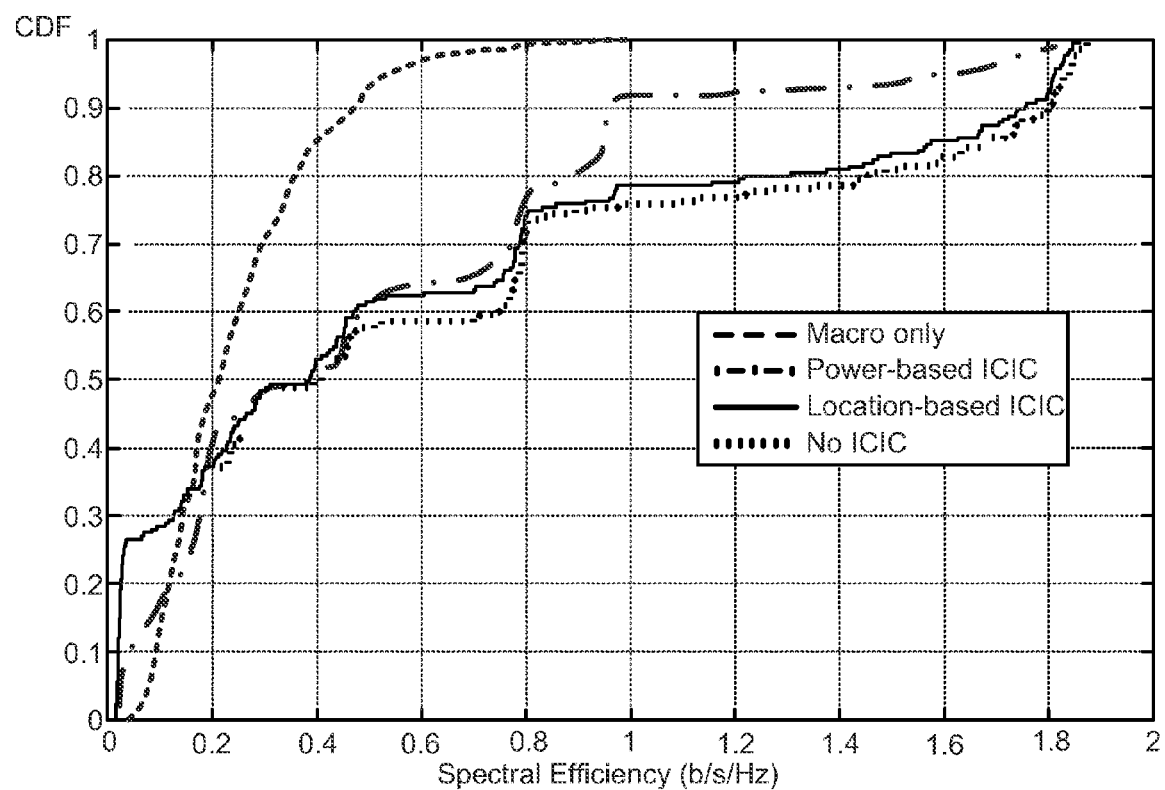
FIG. 10B is a graph of spectral efficiency distributions according to certain embodiments.

FIG. 10B is a graph of the spectral efficiency (SE) CDF distributions of the macro-only, baseline femto, and two A-ICIC techniques according to certain embodiments. The behavior of the SE is a direct result of the SINR, which is shown in FIG. 10A. As shown in FIG. 10B, the portion of UEs achieving high SE represents the femto UEs. On the other hand, the portion of UEs achieving low SE represents the macro indoor UEs, which is improved by the two A-ICIC techniques.

Additional advantages of the A-ICIC embodiments are discussed below with respect to Table 4.

IV. Antenna Direction Control for Adaptive Multi-User Zero Forcing (A-MUZF)

Figure 11:
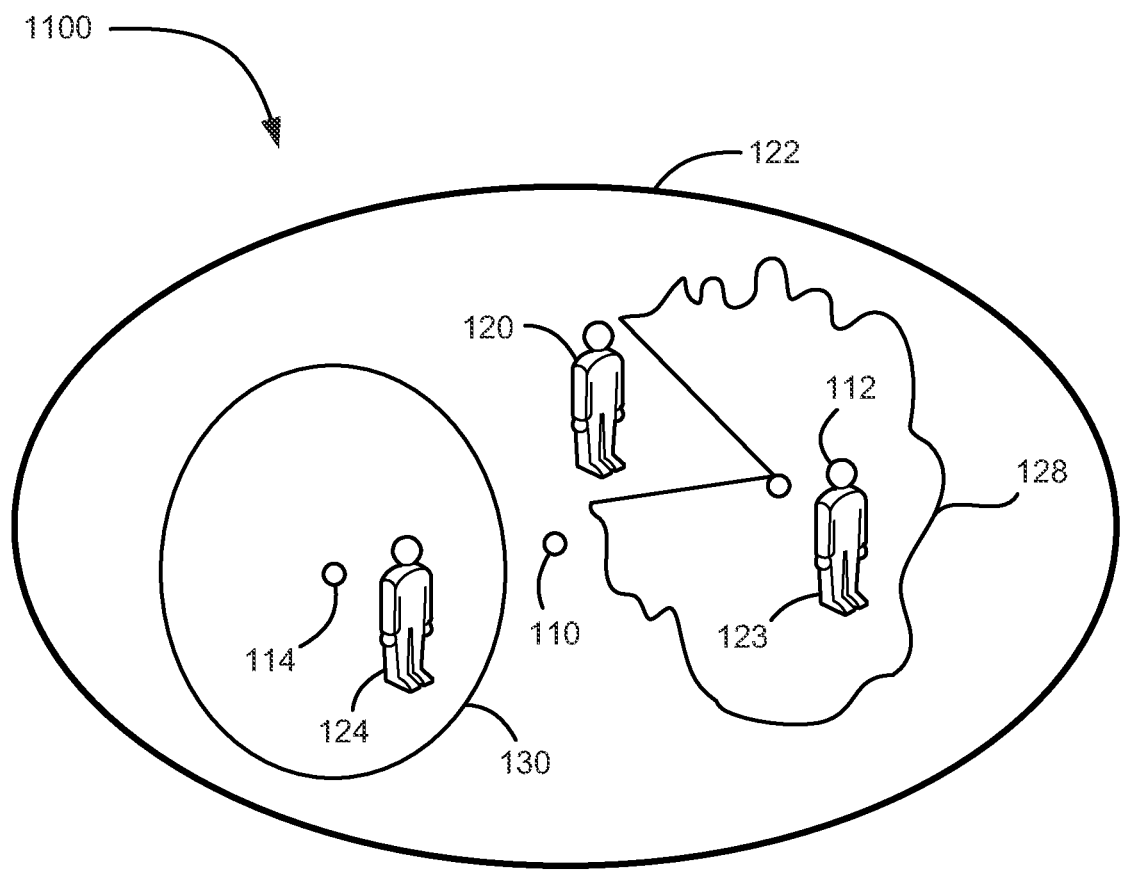
FIG. 11 is a block diagram illustrating a heterogeneous network configured to perform adaptive multi-user zero-forcing according to one embodiment.

In A-MUZF beamforming, only femto stations that detect macro UEs in the neighborhood perform MUZF, and femto stations that do not detect nearby macro UEs transmit normally. For example, FIG. 11 is a block diagram illustrating a heterogeneous network 1100 configured to perform A-MUZF according to one embodiment. The network 1100 includes the macro eNB 110 with its transmission coverage area 122 and the femto stations 112, 114 discussed above with respect to FIG. 1B. The macro indoor user 120 and the femto users 123, 124 are also shown. In this example, the femto station 112 detects the presence of the macro indoor user 120 and responds by applying the MUZF algorithm to reshape the femto coverage area 128 and avoid interfering with the macro indoor user 120. While the macro indoor user 120 remains in the neighborhood, the femto user 123 experiences a slight decrease in power, but the temporary change is generally not over burdensome. Because there are no macro users in the neighborhood of the femto station 114, the coverage area 130 of the femto station 114 remains unchanged and the femto user 124 is not affected. Thus, the femto UEs benefit from A-MUZF as some of them are not subjected to any change, while macro UEs benefit from having an interference free channel to transmit their data through.

In the A-MUZF algorithm, the femto station 112 estimates its channel(s) towards its neighboring macro indoor UE(s)

(e.g., corresponding to the macro indoor user 120). The singular value decomposition of $H_{j,k}$ can be obtained as $$H_{j,k} = USV^H, \quad (7)$$

where U and V are unitary matrices and S is a diagonal matrix. Then the femto station 112 obtains the null space, which is orthogonal to the space spanned by channels of the macro indoor UEs as in $$Q = \text{null}(V(:,1)), \quad (8)$$

where $V(:,1)$ is the primary eigen vector, Q is null space matrix with dimensions Nt×d where d=Nt−dim(interference subspace) and, since one single-rate user is canceled, therefore d=Nt−1. The femto station 112 multiplies its transmitted signal, directed to its femto UE (e.g., of the femto user 123), by the null space matrix. Note that the macro indoor UEs' channels can be estimated by listening to the uplink channel, where the macro indoor UEs send their reference signals in an attempt to associate with the femto station 112. This is possible for time division duplex (TDD) systems, for example, as the downlink and uplink channels are almost the same. In certain embodiments, the beamforming is adjusted as the macro indoor UEs move within the coverage area of the femto station to maintain the null space orthogonal to the space spanned by channels of the macro indoor UEs. In addition, or in other embodiments, in the A-MUZF technique as in the A-ICIC embodiments discussed above, the location-based (e.g., apartment-based) and power-based approaches may be used to identify macro UEs in the femto station neighborhood.

V. Adaptive Power ICIC and MUZF

The two schemes described above focus on interference mitigation in one dimension only, either time frequency resource-blocks (as in A-ICIC), or the spatial domain (as in A-MUZF). In certain embodiments, power control is also applied on top of these two schemes. Generally, power control aims to reduce the transmission power of each femto station below its maximum value to reduce its interference on the nearby macro UEs, while guaranteeing required QoS (SINR in this case) for the femto UEs (e.g., FF-AP). More specifically, all the femto stations have a low initial power value, which increases (in small steps) until the required SINR of its associated femto UE is achieved.

In one embodiment, adaptive power inter-cell interference coordination (AP-ICIC) adapts the transmission power of each femto station on the time-frequency RBs, where femto stations transmit their data. In another embodiment, adaptive power multi-user zero forcing (AP-MUZF) applies power control for the femto station in addition to the nulling precoding discussed above.

To characterize the performance gains of the various schemes, the average SE delivered by the macro station and femto stations is calculated. In addition, the total area SE achieved over the total sector area is calculated, which in this example is the total SE achieved by one macro station and six femto stations. Further, the cell-edge SE achieved by each scheme is calculated. Table 4 summarizes the results of several different example scenarios.

TABLE 4

Performance Results of Various Scenarios

| SCENARIO | MACRO SE | FEMTO SE | TOTAL SECTOR AREA SE | FSs AFFECTED | CELL-EDGE SE |
|---|---|---|---|---|---|
| Macro-only | 2.18 | — | 2.18 | — | 0.035 |
| Femto baseline | 1.89 | 1.74 | 12.32 | 0% | 0.02 |
| ICIC | 1.96 | 0.91 | 7.43 | 100% | 0.039 |
| Location-based A-ICIC | 1.9 | 1.64 | 11.72 | 15% | 0.021 |
| Power-based A-ICIC | 1.92 | 1.41 | 10.36 | 37% | 0.027 |
| Location-based A-MUZF | 1.89 | 1.71 | 12.15 | 15% | 0.02 |
| Power-based MUZF | 1.91 | 1.6 | 11.5 | 37% | 0.027 |
| Power-based FF-AP-ICIC | 2.02 | 1.56 | 11.37 | 24% | 0.042 |
| Power-based AP-MUZF | 1.99 | 1.47 | 10.38 | 26% | 0.041 |

Comparing macro-only to femto baseline in Table 4, it is shown that deploying femto stations increases the total area (1 macro+6 femtos) SE by 465% (from 2.18 to 12.32). On the other hand, deploying femto stations reduces the cell-edge SE by 42% (from 0.035 to 0.02). Due to such loss in the cell-edge SE, the ICIC algorithm was previously proposed. Table 4 depicts that the ICIC significantly increases the cell-edge SE to 0.039, achieving gain of 11% in the cell-edge SE compared to the macro-only case. However, the ICIC reduces the gain in the total area SE by 241% compared to the macro-only case.

Table 4 shows that the location-based (e.g., apartment-based) A-ICIC does not increase the cell-edge SE beyond that achieved by the femto baseline case. This is due to the observation that only 15% of femto stations apply the ICIC algorithm, which is not sufficient to improve all the macro indoor UEs. As for the power-based A-ICIC technique, note that it increases the cell-edge SE to 0.027, which is still lower than that of the macro-only case. Hence, the two A-ICIC techniques increase the total area SE, however, they achieve lower cell-edge SE compared to the macro-only case. Looking at the results of the A-MUZF (either location-based or power-based), note that they give similar performance to the A-ICIC schemes, with cell-edge SE being lower than that of the macro-only scenario. Thus, it is shown that neither A-ICIC nor A-MUZF, according to certain embodiments, can achieve the needed or desired cell-edge SE. By considering adaptive power control and focusing only on the power-based adaptive mode, both femto focused AP-ICIC and AP-MUZF achieve higher cell-edge SE than that of the macro-only case. Further, femto focused AP-ICIC and AP-MUZF achieve very high total sector area SE. For example, the FF-AP-ICIC achieves total area SE improvement of 422% with cell-edge SE improvement of 20%. Similar improvements are achieved by the AP-MUZF scheme.

By way of summary, deploying femto stations increases the SINR of their associated femto UEs and has little or no negative impact on the outdoor macro UEs. However, deploying femto stations decreases the SINR of the macro indoor UEs. To improve the performance of the macro indoor UEs, certain embodiments use various interference mitigation algorithms spanning the time-frequency, spatial, and power dimensions. In certain embodiments, neither the A-ICIC nor the A-MUZF schemes guarantee the baseline (macro-only)

cell-edge SE. However, certain such embodiments use AP-ICIC and/or AP-MUZF to improve both the total sector area SE and the cell-edge SE. Compared to the macro-only case, the AP-ICIC achieves total area SE improvement of 422% with cell-edge SE improvement of 20%.

VI. Adaptive Power Control to Selectively Favor User Groups

Power-control adjusts the femto station power to satisfy either macro or femto QoS, or power control may simply broadcast a unanimous fixed power threshold to all femto stations according to their density. When fixed power is used, all femto stations unanimously send with the same transmission power. If, however, a non-unanimous, adaptive power (AP) control is used, every femto station decides on the amount of power that it transmits based on feedback from the UEs attached to it. AP adaptation algorithms focus on either favoring femto users (FF-AP) or favoring macro users (MF-AP). FF-AP is used to adjust the femto transmission power to satisfy a target femto SINR to improve the network capacity. MF-AP is used to adjust the femto transmission power to satisfy a target macro SINR.

Certain embodiments disclosed herein use adaptive power inter-cell interference coordination (AP-ICIC) and/or adaptive power with constraint (AP-C). AP-ICIC applies ICIC by shutting off the femto transmission for a percentage of the resource blocks. AP-C is used to avoid jeopardizing the group out of focus. In FF-AP, for example, a macro SINR level constraint may be enforced (FF-AP-MC) such that femto stations do not increase their power more than a certain level that may affect a macro UE, hence it does not decrease cell edge. As another example, in MF-AP, a femto SINR level constraint may be enforced (MF-AP-FC) such that femto stations do not decrease their power below a certain level to avoid harming associated femto UE, hence it does not degrade capacity. AP with its different variations may be applied, along with different variations of ICIC, to achieve best or improved values for both cell edge and cell capacity. The following embodiments improve the UE experience through improving the macro UE (e.g., using ICIC or MUZF) and/or improving the femto UE through AP.

A. AP-ICIC (AP-ICIC, AP-S-ICIC, AP-A-ICIC)

Certain embodiments depend on the femto station applying a type of ICIC (whether conventional, selective, or adaptive) and then applying AP over the network. Embodiments for selective ICIC (S-ICIC) and conventional ICIC provide a high increase to the macro indoor users' throughput by shutting off femto resources at the same time as applying the low power of the femto station. In spite of providing for the quality of service level for the femto users, the femto stations do not use a portion of their resources such that the network capacity decreases.

For adaptive ICIC (A-ICIC), the femto UEs are not degraded (or are only slightly degraded) because not all femto cells are affected. Further, any femto UE performance that was degraded by ICIC may be compensated through AP to reach an acceptable level of QoS, and any macro UE affected by femto interference may be offered a femto free zone for its transmission to increase its throughput and improve cell edge performance.

B. AP-A-MUZF

In certain embodiments, a femto station applies A-MUZF to guarantee an interference free zone for the macro UE to transmit its signals. Then, the femto station applies AP to provide femto UEs with a certain threshold of QoS, which provides needed power to satisfy the femto QoS over the directed transmission. The macro UEs and femto UEs have good throughput in such embodiments because each is dealt with independently. AP-A-MUZF provides high cell edge performance and capacity, but may have high complexity in certain embodiments, due to the MUZF complexity.

C. Favoring Femto Users Through Femto Focused Adaptive Power Adaptation (FF-AP)

Figure 12:
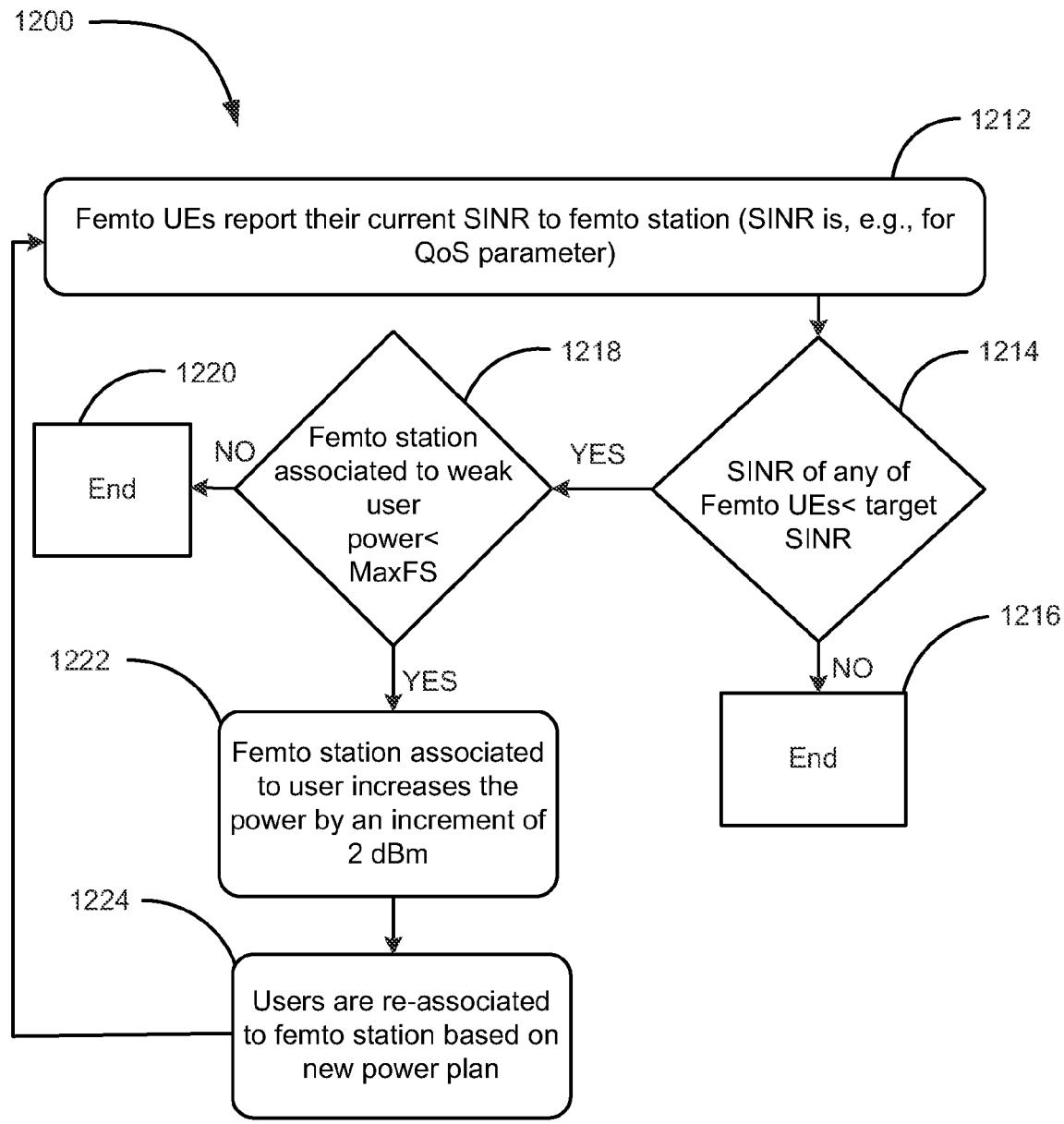
FIG. 12 is a flow chart of an example method for femto focused adaptive power adaptation according to one embodiment.

While ICIC provides better service for macro users, power adaptation may be used in certain embodiments to improve performance for femto users. The power control algorithms depend on varying the transmission power of the femto station to satisfy a certain QoS of the femto UEs, which is the SINR. FIG. 12 is a flow chart of an example method 1200 for FF-AP according to one embodiment. With all femto stations set to a minimum power, the method 1200 includes the femto UEs reporting 1212 their current SINR to an attached femto station (where the SINR is, e.g., for a QoS parameter). The method 1200 then queries 1214 whether the SINR of any of the femto UEs is less than a target SINR. If no, then the method 1200 ends 1216. If, however, any femto UE SINR is below the target SINR, the method queries 1218 whether the power of the femto station associated to the weak user is less than a maximum power (MaxFS) of the femto station. If no, the method 1200 ends 1220. If, on the other hand, the power of the femto station associated to the user is less than the maximum power, then the femto station associated to the user increases 1222 its power. In this example, the femto station increases its power by an increment of 2 dBm. However, larger or smaller increments may be used. In case of any change in the femto station power, the users are re-associated 1224 to the femto stations in the network based on the new power plan. Then, the method 1200 repeats until either all femto UEs satisfy the required SINR or their attached femto stations reach their maximum allowed power.

A problem that may occur with FF-AP is that it does not take into consideration the effect of the power increase over the macro UEs SINR, which may lead to reducing the performance of the macro UEs. To overcome this problem, certain embodiments add a macro constraint over the FF-AP, as described below.

D. Favoring Macro Users Through Macro Focused Adaptive Power Adaptation (MF-AP)

In MF-AP, femto stations are each given a maximum power. If the femto station is interfering with a macro UE, it decreases its power until the macro UEs reach the SINR needed. In case of any change in femto station power, re-association is done to all users in the network based on the new power plan. Then, the process repeats until either all macro UEs satisfy the required SINR or their attached femto stations reach their maximum allowed power. But, MF-AP may lead the femto UEs to suffer greatly due to a high decrease in the femto station power. Thus, described below, certain embodiments avoid this problem by using MF-AP-FC.

E. Favoring Macro Users Through Macro SINR Constraint Over the FF-AP (FF-AP-MC)

The FF-AP with macro constraint (FF-AP-MC) is similar to the AP scheme but it adds a variable into consideration, the macro UE SINR. FF-AP-MC provides a compromise between both groups of users. Femto users are not served as well as they are in normal AP-FF because their QoS is no longer guaranteed to be satisfied. Macro UEs are not over burdened by high power from the femto station. If macro UEs surpass the threshold limit, the femto station is not allowed to further increase its power.

Figure 13:
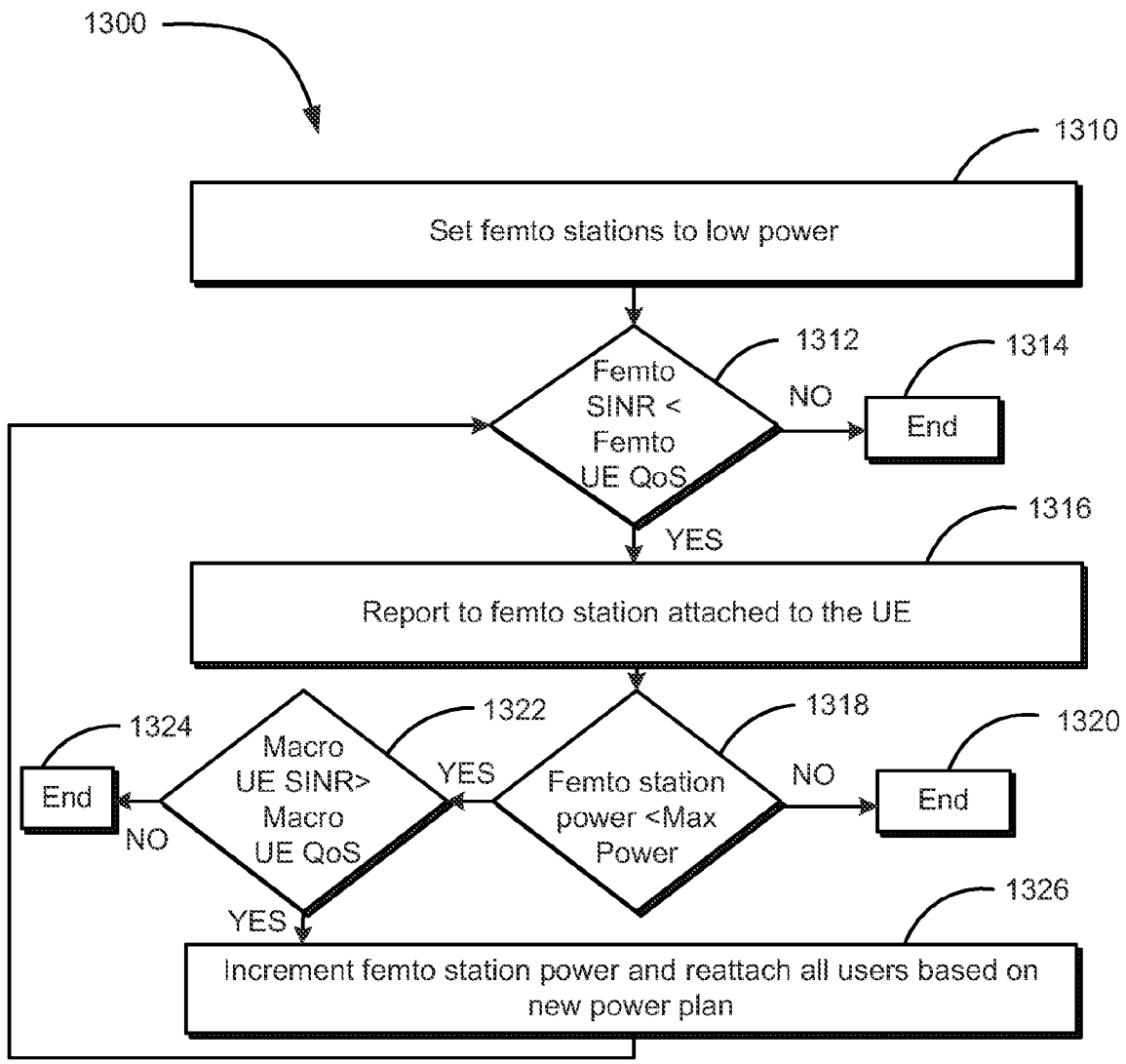
FIG. 13 is a flow chart of an example method using femto focused adaptive power adaptation with macro constraint according to one embodiment.

FIG. 13 is a flow chart of an example method 1300 using FF-AP-MC according to one embodiment. The method 1300 includes setting 1310 the femto stations to a low power and querying 1312 whether the femto SINR is less than a target femto UE QoS. If no, the method 1300 ends 1314. If, however, the femto SINR is less than the target femto UE QoS, the method 1300 reports 1316 to the femto station attached to the UE and queries 1318 whether the femto station power is less than a maximum power for the femto station. If no, the method 1300 ends 1320. If, on the other hand, the femto station power is less than the maximum power of the femto station, the method 1300 queries 1322 whether the macro UE SINR is greater than a target macro UE QoS. If no, the method 1300 ends 1324. If, however, the macro UE SINR is greater than the target macro UE QoS, the method 1300 increments 1326 the femto station power and reattaches all users based on the new power plan. Then, the method 1300 repeats until all femto UEs satisfy the target femto SINR, their attached femto stations reach their maximum allowed power, or all macro UEs satisfy the target macro SINR.

Thus, if any macro UE SINR is below the constraint value of Macro SINR, the femto station causing interference to the macro UE cannot increase its power, and hence, no more interference occurs over the macro UE. In certain embodiments, the constraint is not based over the macro-only scenario or to avoid a risk of disassociating the femto UE as the femto station power is not allowed to increase to an acceptable level. In an example embodiment, the constraint is 30% of the SINR CDF of macro UEs in the femto baseline. In certain embodiments, A-ICIC is added to macro performance.

F. Favoring Femto Users Through Femto SINR Constraint Over the MF-AP (MF-AP-FC)

As macro constraint is applied to FF-AP, according to certain embodiments, femto constraint is applied to MF-AP. All femto stations start transmitting at their maximum power level, and decrement to reach the macro SINR level. But, in case the SINR of the femto UEs attached to the femto station go below a certain threshold, the femto station does not lower its power.

G. AP-Macro Constraint-A-ICIC (AP-MC-A-ICIC)

In certain embodiments, AP-MC-A-ICIC is used to improve over AP-MC. As AP-MC takes macro UEs into consideration, A-ICIC may be added to ensure better performance of cell edge users. A-ICIC only affects users connected to femto stations interfering with a macro UE. After applying AP-MC, the number of stations causing interference over macro UEs is less due to the power change. Thus, the decrease in capacity due to applying A-ICIC is minimal. The power of the femto station in AP-MC is lower than that of AP only because in AP-MC the femto UEs are not guaranteed to reach their QoS level, due to macro constraint. Thus, the power of the femto stations can stay below satisfying the femto UEs. Applying A-ICIC means that any femto causing interference to a macro UE frees part of its resources for use by macro UEs without femto interference. This implies better performance for the macro UEs. Also, macro UEs in such embodiments are guarded against high interference by having a constraint over the femto power by using the macro UE QoS parameter to limit the ability of the femto station to increase power. Thus, the interference level may be controlled. In certain embodiments, AP-MC-A-ICIC provides a useful compromise between cell edge and capacity because it allows for a high capacity increase with a very low decrease in cell edge, as compared to a femto baseline.

VII. Example Performance Analysis

Table 5 shows example results of running different simulations for 20 runs. In this example, the Femto cells and UE deployment differ from one run to the other to cover different states of randomization. Each run simulates 100 frames.

TABLE 5

Simulation Results

| SCENARIO | CELL CAPACITY (b/s/Hz) | CELL-EDGE (b/s/Hz) | % OF FSs AFFECTED |
|---|---|---|---|
| FF-AP | 12.568 | 0.037 | N/A |
| MF-AP | 10.433 | 0.041 | N/A |
| FF-AP-MC | 12.371 | 0.041 | N/A |
| MF-AP-FC | 10.601 | 0.037 | N/A |
| MF-AP-ICIC | 6.546 | 0.043 | 100 |
| MF-AP-A-ICIC | 9.583 | 0.027 | 24.4 |
| FF-AP-MC-A-ICIC | 11.19 | 0.047 | 23 |

In Table 5, the AP embodiments may be evaluated against various scenarios shown in Table 4: macro-only, femto baseline, ICIC, and AP basic algorithms. These algorithms are evaluated in terms of total area SE and the cell-edge SE. In this example, the total area SE is the SE achieved over the sector area, which includes one macro station and six femto stations. In the macro-only scenario, none of the femto stations transmits data, while the femto baseline case represents the scenario in which all the femto stations are transmitting with no interference coordination. Also, in this example, the AP technique had a maximum femto station power of 20 dBm, a minimum femto station power of −10 dBm, a femto SINR target of 25% of CDF of femto UEs SINR before doing AP which was 10, and an increment of change of 2 dBm. All A-ICIC and ICIC are based on 50% shut off of resources.

Table 5 shows that the MF-AP technique provides for a minimal macro SINR level, which leads to an improvement in the performance of the macro UEs that are below the target SINR. Thus, the MF-AP algorithm decreases the gap between femto baseline and macro-only cell edge to 16% with an area SE of 372.98%, as compared to the macro-only scenario.

The FF-AP technique gives a guarantee of a femto SINR level, which leads to an improvement in the performance of the femto UEs that are below the target SINR. Consequently, the FF-AP algorithm achieves higher area SE of 469.78%, and a cell-edge SE increase of 22.33%, as compared to the macro-only scenario. The increase in cell edge is justified for the decrease in power of the femto station, which leads to an increase in the SINR of the macro UEs.

The MF-AP-ICIC leads to an increase of 43% in cell edge but with an increase of only 197% in capacity. MF-AP-A-ICIC produces a higher increase in capacity than AP-ICIC, as it provides a 334% increase over the macro-only, but AP-A-ICIC does not maintain the increase in cell edge as it gives a cell edge decrease of around 10%. The 10% decrease is around 30% of the decrease in the A-ICIC without AP and such a decrease in cell edge may be considered an acceptable sacrifice in some embodiments for the increase in capacity.

It is shown in Table 5 for FF-AP-MC that femto throughput is lower than that of unanimous power because not all femto users may be able to satisfy their SINR condition, as some of the femto users are restricted by the macro constraint. But, because the macro constraint is low due to being based on femto baseline and not the macro-only scenario, the femto stations are able to provide a good increase in cell edge of 460%, which is very close to the 463% increase provided by the AP. FF-AP-MC is also less complex than adding ICIC and depends on best resource utilization, as it allows all femto resources to be used by femto users that are originally allocated to them. Consequently, the resources are given to low interference users.

Figure 14:
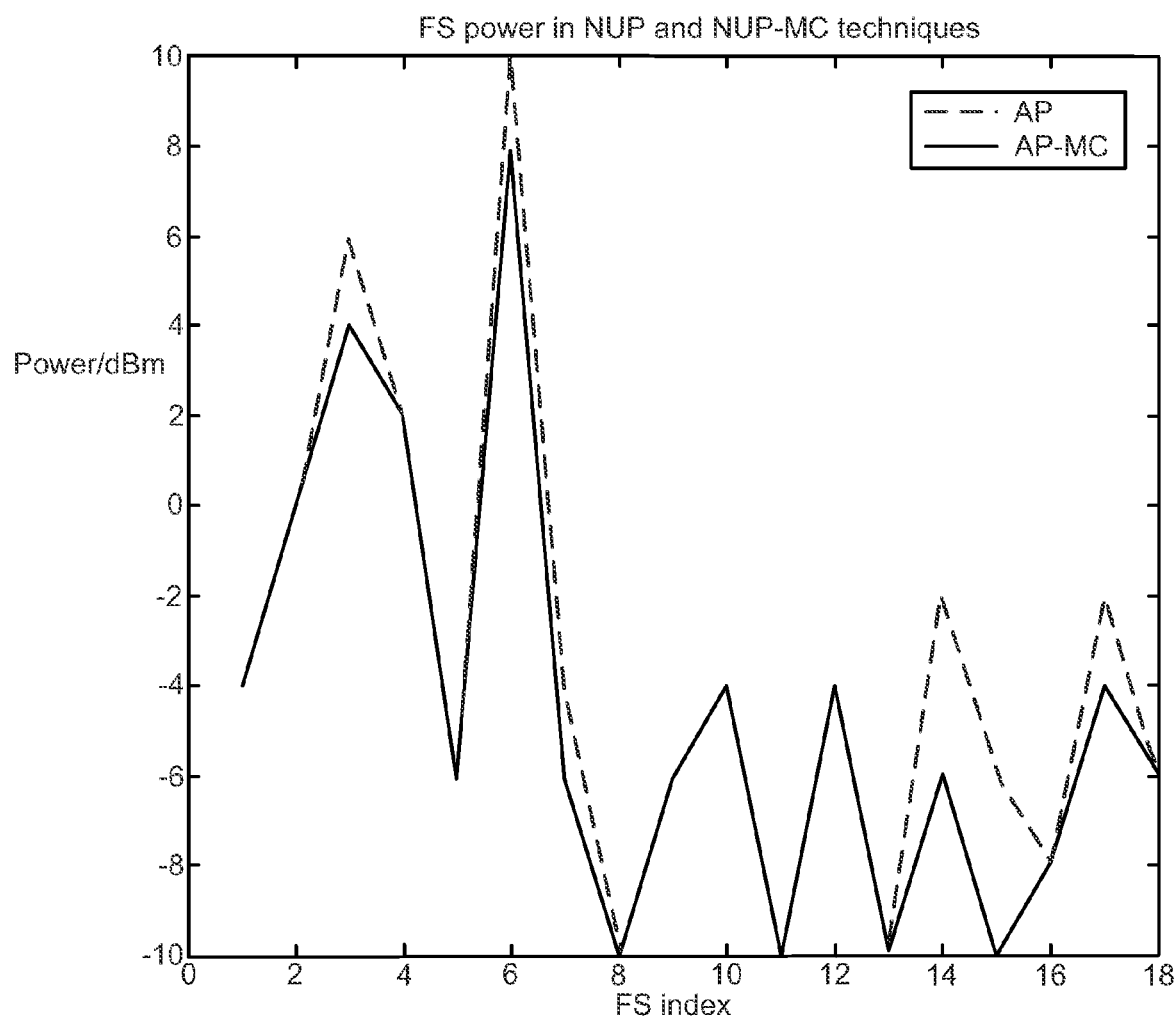
FIG. 14 is a graph illustrating femto station power after applying adaptive power and adaptive power with macro constraint according to certain embodiments.

Further, FF-AP-MC provides for very low femto power in comparison to constant power. The mean power for FF-AP-MC is around −4 dBm to −2 dBm, while the power used in the femto baseline is 20 dBm in all cases. FIG. 14 is a graph illustrating femto station power after applying AP and AP-MC according to certain embodiments. There is a decrease in femto station power using AP. However, as shown in FIG. 14, the power decrease is slightly more for AP-MC because the constraint leads to not increasing power so as to satisfy the SINR value for femto users.

In the example shown in Table 5, MF-AP-FC improves MF-AP by increasing the cell edge and throughput over those of the MF-AP. Because MF-AP does not take into consideration femto UEs, it may lead femto UEs disattaching from the very low power femto station and instead attaching to the macro station without a guarantee of their SINR level because they would be considered by the network as femto UEs. Consequently, the femto UEs may act as cell edge UEs with a decrease of around 15% cell edge from the macro-only. However, in certain MF-AP-FC embodiments disclosed herein, the limit of the FC constraint guarantees that all femto stations can serve their UEs and that there is no need to disassociate. Consequently, cell edge greatly increases above that of MF-AP to reach around 23% increase from macro-only, instead of a decrease of 15% in MF-AP. Also, MF-AP-FC increases cell capacity by around 380% compared to macro-only, which is 7% higher from the MF-AP increase.

In AP-MC-A-ICIC, A-ICIC is done after applying FF-AP-MC. In the example shown in Table 5, the performance of FF-AP-MC is the best in conserving good cell edge from the power control techniques. Thus, A-ICIC may be chosen to avoid sacrificing unnecessary capacity to improve already acceptable cell edge. In AP-MCA-ICIC, the macro constraint does not prohibit interference over macro resources, so macro users' improvement can be achieved through applying ICIC. In applying ICIC, it is noted that the percentage of femto stations affected decreases from 24.4% in AP-A-ICIC to 23% in AP-MC-A-ICIC. This decrease may occur because the SINR of the macro UEs is already adjusted not to be below a certain level. Consequently, the percentage of interfering femto stations is less. AP-MC-A-ICIC gives an increase in capacity with 407.340%, which is lower than AP-MC because of applying ICIC to 23% of the femto stations. AP-MC-A-ICIC cell edge increase is around 55% compared to macro-only. Thus, in this example, AP-MC-A-ICIC comes second in providing cell edge after the 90% increase from the AP-ICIC technique. Moreover, AP-MC-A-ICIC gives a very satisfying increase in capacity of around 4 times the capacity provided by the macro-only technique. In this example, none of the other considered techniques achieve such a high cell edge as the AP-MC-A-ICIC with such a high increase in capacity.

In summary, heterogeneous networks increase the capacity and performance of mobile communications networks by adding low power nodes. One type of low power nodes is femto cells. A major challenge facing heterogeneous networks is the interference between different power nodes and its dramatic effect on the macro UEs. The AP-ICIC and the AP-C are two embodiments disclosed herein to solve this problem. AP-ICIC, on one hand, shuts off some of the femto resource blocks or directs the femto transmission away from the macro transmission to increase the macro indoor UEs' SE and hence increases the cell-edge SE. On the other hand, AP-ICIC adjusts the femto station's transmission power to achieve the desired femto UE QoS and hence increases the area SE. The AP-ICIC can produce increased area SE of 245% over homogeneous networks that only use macro stations, and can produce a cell edge increase of 94% versus a decrease in cell edge of 60% produced when adding femto cells with no interference mitigation technique.

FF-AP-MC and MF-AP-FC solve a problem of FF-AP and MF-AP, respectively, which is not taking the other UE group into consideration. The embodiments add a constraint over the AP technique to avoid putting high interference over the macro indoor UEs. FF-AP-MC may give an increase in capacity of about 460% with a cell edge increase of about 37% compared to macro-only, with a much lower complexity than ICIC techniques and with high power saving. Also MF-AP-FC improves over the MF-AP as it gives about a 380% increase in capacity and a 23% increase in cell edge. A better cell edge may be produced from MF-AP-FC when adding A-ICIC to have AP-MC-A-ICIC. AP-MC-A-ICIC may give a cell edge increase of about 55% with an increase in capacity of about 407%, which ranks second best in cell edge and increases capacity by four times compared to macro-only techniques, beside saving power as most femto stations may be sending at much lower than their maximum power. But, AP-MC-A-ICIC may have a high complexity.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A non-transitory machine readable storage medium having stored thereon instructions, which when executed by a processor, cause the processor to perform a method for interference mitigation in a heterogeneous network including one or more femto cells within a macro cell coverage area, the method comprising:
   detecting, at a femto station, a macro user equipment (UE) operating within a femto coverage area of the femto station and a macro transmission channel toward the macro UE, wherein a measured first signal power of a macro UE received at the femto station is greater than a second signal power of the macro UE received at a macro station, the second signal power indicated in a message received by the femto station; and
   in response to detecting the macro UE:
      estimating the macro transmission channel toward the detected macro UE;
      calculating an orthogonal transmission channel to the estimated macro transmission channel, the orthogonal transmission channel calculated to reduce or minimize a femto transmission interfering with the macro transmission channel; and
      selecting the orthogonal transmission channel for the femto transmission;
      determining a beamformed signal for the femto transmission to reduce or minimize transmission toward the detected macro UE;
      beamforming, using multiple antennas of the femto station, the femto transmission from the femto station according to the orthogonal transmission channel and beamformed signal to reduce or minimize the femto transmission interfering with the detected macro UE.

2. The non-transitory machine readable storage medium of claim 1, wherein the beamforming comprises multiplying the signal by a null space matrix according to the orthogonal transmission channel.

3. The non-transitory machine readable storage medium of claim 1, wherein estimating the transmission channel toward the detected macro UE comprises determining a direction of an uplink channel received from the detected macro UE.

4. The non-transitory machine readable storage medium of claim 1, wherein detecting the macro UE operating within the coverage area of the femto station comprises:
   receiving, at the femto station, a message from the macro UE indicating that power of a first signal received by the macro UE from a macro station is lower than power of a second signal received from the femto station.

5. The non-transitory machine readable storage medium of claim 1, wherein detecting the macro UE operating within the coverage area of the femto station comprises:
   measuring the measured first signal power of a first signal received at the femto station from the macro UE;
   receiving, at the femto station, a message from a macro station indicating the measured second signal power of a second signal received at the macro station from the macro UE; and
   determining that the first signal is greater than the second signal, the determination indicating that the macro UE is detected within the coverage area of the femto station.

6. The non-transitory machine readable storage medium of claim 1, wherein detecting the macro UE operating within the coverage area of the femto station comprises:
   receiving a location message, at the femto station, indicating a geographic location of the macro UE; and
   determining that the geographic location of the macro UE is within the coverage area of the femto station.

7. The non-transitory machine readable storage medium of claim 6, wherein the location message is received from the macro UE.

8. The non-transitory machine readable storage medium of claim 6, wherein the location message is received from a macro station.

9. The non-transitory machine readable storage medium of claim 1, the method further comprising:
   determining that the macro UE is no longer operating within the femto coverage area; and
   in response to the determination, transmitting the signal from the femto station in the direction of the estimated macro transmission channel previously avoided by the beamforming.

10. The non-transitory machine readable storage medium of claim 1, the method further comprising:
    setting a first transmission power of the femto station for communicating with at least one femto UE within the coverage area of the femto station;
    at the first transmission power, measuring a quality of service (QoS) for the at least one femto UE within the femto coverage area;
    comparing the measured QoS with a target QoS; and
    incrementally increasing the power of the femto station from the first transmission power to a second transmission power at which the target QoS is met for each of the at least one femto UE within the femto coverage area.

11. The non-transitory machine readable storage medium of claim 10, the method further comprising constraining an overall increase in the power of the femto station so as to maintain a desired QoS for the detected macro UE.

12. The non-transitory machine readable storage medium of claim 1, the method further comprising:
    setting a first transmission power of the femto station for communicating with at least one femto UE within the coverage area of the femto station;
    at the first transmission power, measuring a quality of service (QoS) for the macro UE detected within the femto coverage area;
    comparing the measured QoS with a target QoS; and
    decrementing the power of the femto station from the first transmission power to a second transmission power at which the target QoS is met for macro UE within the femto coverage area.

13. The non-transitory machine readable storage medium of claim 12, the method further comprising constraining an overall decrease in the power of the femto station so as to maintain a desired QoS for the at least one femto UE within the coverage area of the femto station.

* * * * *